(12) United States Patent
Yokoi

(10) Patent No.: US 7,900,558 B2
(45) Date of Patent: Mar. 8, 2011

(54) RADIATION-CURABLE POLYMERIZABLE COMPOSITION, INK COMPOSITION, INKJET RECORDING METHOD, PRINTED MATERIAL, PLANOGRAPHIC PRINTING PLATE, AND METHOD FOR FORMING PLANOGRAPHIC PRINTING PLATE

(75) Inventor: Kazuhiro Yokoi, Haibara-gun (JP)

(73) Assignee: Fujifilm Corporation, Tokyo (JP)

( * ) Notice: Subject to any disclaimer, the term of this patent is extended or adjusted under 35 U.S.C. 154(b) by 352 days.

(21) Appl. No.: 12/024,253

(22) Filed: Feb. 1, 2008

(65) Prior Publication Data

US 2008/0187727 A1    Aug. 7, 2008

(30) Foreign Application Priority Data

Feb. 2, 2007   (JP) ................................. 2007-024705

(51) Int. Cl.
| | |
|---|---|
| C09D 11/00 | (2006.01) |
| C09D 11/10 | (2006.01) |
| B41C 1/10 | (2006.01) |
| B41N 1/00 | (2006.01) |
| B05D 1/32 | (2006.01) |
| C08K 5/17 | (2006.01) |
| C08K 5/18 | (2006.01) |

(52) U.S. Cl. .......... 101/130; 101/135; 101/453; 427/466; 430/280.1; 522/25; 522/28; 522/83; 522/167; 522/170

(58) Field of Classification Search ................... 522/26, 522/28, 83, 167, 170; 430/280.1; 427/466; 101/130, 453

See application file for complete search history.

(56) References Cited

U.S. PATENT DOCUMENTS

| | | | | |
|---|---|---|---|---|
| 5,973,020 | A | * | 10/1999 | Kerr et al. ........................ 522/25 |
| 6,558,753 | B1 | * | 5/2003 | Ylitalo et al. ................... 427/466 |
| 6,645,696 | B1 | * | 11/2003 | Simison et al. ............. 430/280.1 |
| 6,777,459 | B2 | * | 8/2004 | Al-Akhdar et al. ............. 522/18 |

FOREIGN PATENT DOCUMENTS

| | | |
|---|---|---|
| EP | 1 700 890 A2 | 9/2006 |
| EP | 1 702 962 A1 | 9/2006 |
| JP | 9183928 A | 7/1997 |
| JP | 2003341217 A | 12/2003 |
| JP | 2004238456 A | 8/2004 |

\* cited by examiner

*Primary Examiner* — Susan W Berman
(74) *Attorney, Agent, or Firm* — Sughrue Mion, PLLC

(57) ABSTRACT

The invention provides a radiation-curable polymerizable composition of the invention having (a) a hindered amine compound having no nucleophilic moiety in a molecule, (b) a photo-acid generating agent and (c) a cationic polymerizable monomer. The invention further provides an ink composition formed of the radiation-curable polymerizable composition, a method for ink jet recording having: ejecting the ink composition onto a recording medium by using an ink jet recording apparatus and irradiating the ejected ink composition so as to cure the ink composition, and a printed material obtained thereby. The invention further provides a method for forming a planographic printing plate having: ejecting the ink composition onto a hydrophilic recording medium by using an ink jet recording apparatus; and irradiating the ejected ink composition so as to cure the ink composition for forming a hydrophobic region, and a planographic printing plate obtained thereby.

17 Claims, No Drawings

RADIATION-CURABLE POLYMERIZABLE COMPOSITION, INK COMPOSITION, INKJET RECORDING METHOD, PRINTED MATERIAL, PLANOGRAPHIC PRINTING PLATE, AND METHOD FOR FORMING PLANOGRAPHIC PRINTING PLATE

CROSS-REFERENCE TO RELATED APPLICATION

This application claims priority under 35 USC 119 from Japanese Patent Application No. 2007-024705, filed on Feb. 2, 2007, the disclosure of which is incorporated by reference herein.

BACKGROUND OF THE INVENTION

1. Field of the Invention

The present invention relates to a radiation-curable polymerizable composition. More specifically, present invention relates to an ink composition suitable for use in inkjet recording, an inkjet recording method and printed materials produced using the method. Furthermore, the invention relates to a planographic printing plate obtained using the ink composition and a method for forming the planographic printing plate.

2. Description of the Related Art

There are various image recording methods for forming images on a recording material, such as paper, based on image data signals, such as electrophotographic methods, sublimation and fusion thermal transfer methods, and inkjet methods. Among these, inkjet methods can be implemented with inexpensive apparatus, and allow efficient use of ink since jets of ink are directed only at areas required for image formation, and form images directly on a recording material, resulting in reduced running costs. In addition, inkjet methods permit printing with a low noise level, and thus they are excellent image recording methods.

In inkjet methods, although printing can be performed, in addition to on paper, on a recording material having no water-absorbing properties, such as a plastic sheet or a metal sheet, there are significant problems in speeding up printing and enhancing image quality. More specifically, in the inkjet method, the time required for drying and curing of ink droplets after printing greatly affects the productivity in printing, as well as the sharpness of printed images.

One of the conventionally-known inkjet methods is a recording method using inkjet recording ink curable by exposure to radiation. According to this method, ink droplets are cured by exposure to radiation immediately after ink jetting or after a certain lapse of time from ink jetting, and thereby productivity in printing can be improved and sharp images can be formed.

By achieving an increase in sensitivity of inkjet recording ink curable by exposure to radiation such as ultraviolet rays, the inkjet recording ink can have high curability when irradiated; as a result, there arise many benefits including a productivity increase in inkjet recording, a reduction in power consumption, an increase in the longevity of a radiation generator through reduction of a load thereon, and prevention of evaporation of low-molecular substances caused by insufficient curing. In addition, the increase in sensitivity enhances the strength of images formed by ink for inkjet recording in particular, and, when high-sensitivity inkjet recording ink is applied to making of a planographic printing plate in particular, the cured strength of image areas is increased and high printing durability can be attained.

In recent years, the inkjet method wherein curing by radiation such as ultraviolet rays takes place has been receiving attention due to it having a relatively weak odor, quick-drying properties and because it allows recording on recording materials having no ink absorbency, and consequently ultraviolet cured inkjet ink compositions utilizing radical polymerization have come to be known. Additionally, cationic polymerization ink compositions have been put forth for the purpose of promoting adhesion to recording materials (See, e.g., Japanese Patent Application Laid-Open (JP-A) No. 9-183928). However, these ink compositions have insufficient stability during storage owing to a reaction based on acids that occurs over time, which constitutes an obstacle to practical utilization. As an attempt to improve storage stability, the technique of adding a basic compound thereto was therefore proposed (See JP-A No. 2003-341217). However, a new problem of a drop in the curing sensitivity of the ink arose, because the basic compound impaired the function of an acid produced by exposure. As a solution to this problem, an ink composition containing a photostable compound was proposed (JP-A No. 2004-238456), but an increase in sensitivity together with storage stability is yet to be sufficiently achieved.

SUMMARY OF THE INVENTION

The invention has been made with consideration given to the above-described problems. The invention provides a radiation-curable polymerizable composition that has high sensitivity to radiation applied for curing and has excellent storage stability.

In addition, by the use of the radiation-curable polymerizable composition, the invention provides an ink composition which is preferable for inkjet recording, can be cured to give high sensitivity and form high-quality images, and has good storage stability as well as excellent adhesion to recording materials. Further, the invention provides an inkjet recording method using the ink composition.

Moreover, the invention provides printed materials and a planographic printing plate which are each obtained by using the ink composition having excellent adhesion to recording materials and high storage stability and being capable of being cured to give high sensitivity by exposure to radiation, and further provides a method for making the planographic printing plate.

It has been found from our studies that a radiation-curable polymerizable composition having good storage stability while maintaining high sensitivity can be obtained by using as an additive a hindered amine compound having a specific structure. In addition, the radiation-curable polymerizable composition can be used as an ink composition preferable for inkjet recording because it resists being cured inside a head and on a nozzle plate by merely receiving faint light reflected from a substrate, and has high continuous jet stability.

Namely, a first aspect of the invention is a radiation-curable polymerizable composition of the invention comprising (a) a hindered amine compound having no nucleophilic moiety, (b) a photo-acid generating agent and (c) a cationic polymerizable monomer.

A second aspect of the invention is an ink composition formed from the radiation-curable polymerizable composition.

A third aspect of the invention is a method for ink jet recording comprising: ejecting the ink composition onto a recording medium by using an ink jet recording printer; and irradiating the ejected ink composition so as to cure the ink composition.

A fourth aspect of the invention is a printed material obtained by a method comprising: ejecting the ink composition onto a recording medium by using an ink jet recording printer; and irradiating the ejected ink composition so as to cure the ink composition.

A fifth aspect of the invention is a method for forming a planographic printing plate comprising: ejecting the ink composition onto a hydrophilic support by using an ink jet recording printer; and irradiating the ejected ink composition so as to cure the ink composition and form a hydrophobic region.

Further, a sixth aspect of the invention is a planographic printing plate comprising a hydrophobic region which is formed by a method comprising: ejecting the ink composition onto a hydrophilic support by using an ink jet recording printer; and irradiating the ejected ink composition so as to cure the ink composition.

The ink composition of the invention not only enables formation of images of high quality and high strength when applied to commonly-used printing methods and providing high-grade printed materials, but also can be used suitably for manufacturing resist, color filters and optical recording disks. In addition, the ink composition of the invention can be also useful as a photo-sculpturing material.

By applying to an inkjet recording method of the invention, the ink composition can be cured with high sensitivity and directly form image areas of high strength according to digital data even when injected onto a recording material having no ink absorbency. Therefore, the ink composition of the invention can be used suitably for the making of planographic printing plates, specifically a planographic printing plate with a large area, such as an A2 size, and the planographic printing plates obtained therefrom can have excellent printing durability.

DETAILED DESCRIPTION

Radiation-curable Polymerizable Composition

The radiation-curable polymerizable composition of the invention can be cured by exposure to radiation, and characterized by having at least (a) a hindered amine compound having no nucleophilic moiety in a molecule, (b) a photo-acid generating agent and (c) a cationic polymerizable monomer.

The "radiation" as used in the invention is not particularly restricted so long as it can impart energy by which an initiation species is produced in a composition irradiated therewith, and examples thereof include α ray, γ ray, X ray, ultraviolet ray, visible ray and electron beam. Among these, ultraviolet ray and electron beam are preferable, and ultraviolet ray is specifically preferable from the viewpoints of curing sensitivity and availability of apparatus. Therefore, the Radiation-curable polymerizable composition of the invention is preferably a polymerizable composition capable of being cured by irradiation with ultraviolet rays.

Respective components used in the Radiation-curable polymerizable composition of the invention are described hereinafter.

(a) Hindered Amine Compound Having No Nucleophilic Moiety

The (a) hindered amine compound having no nucleophilic moiety (hereinafter sometimes referred to as "a hindered amine compound having the specific structure"), which is a characteristic component of the radiation-curable polymerizable composition of the invention, is characterized by not having any nucleophilic moiety other than a basic nitrogen atom having great steric hindrance.

The "nucleophilic moiety" as used herein means a functional group having a nucleophilic property attributed to an unshared electron pair, with examples including an ester group, an ether group, a hydroxyl group, an amino group, a thiol group, a thiocarbonyl group and a thioester group. By using a hindered amine compound having the specific structure, it becomes possible to trap an acid produced in a trace amount without inhibiting a cationic polymerization reaction, so that stability over time and exposure stability can be improved since high sensitivity is maintained.

Commercially available light stabilizers such as HALS (trade name, manufactured by Ciba Specialty Chemicals Inc.) or SANOL (trade name, manufactured by Sankyo Lifetech Co., Ltd.), which cannot fully exhibit the sensitivity retaining capability of hindered amine due to having an ester structure as a nucleophilic moiety in a molecule, are not included in the scope of the (a) hindered amine compound having the specific structure according to the invention.

In order to decrease its reactivity with a cationic terminal, a basic nitrogen in a hindered amine compound having the specific structure is required to have sufficient steric hindrance. The presence of many molecules around the basic nitrogen atom of the hindered amine compound having the specific structure causes steric hindrance so as to reduce factors which inhibits cationic polymerization reaction. From the viewpoint of maintaining sensitivity, the basic nitrogen atom specifically preferably has a tertiary amine structure due to its large degree of steric hindrance. Utilization of primary or secondary amines is thought to lead to a decrease in sensitivity since primary or secondary amines provide sufficient steric hindrance only with difficulty, and are associated with a drop in polymerization degree of polymers produced in a cured film through chain transfer in the polymerization system.

The addition of the (a) hindered amine compound having the specific structure in the invention allows enhancement of light stability and heat stability while maintaining high sensitivity. Although the details of the mechanism of the invention are not clear, the following is assumed.

The hindered amine compound having the specific structure defined in the invention can improve stability because it traps trace amounts of acids undesirably produced under exposure to heat or light. In addition, when the curing is performed by usual exposure, a basic moiety of the hindered amine compound for use in the invention does not inhibit a growth reaction at cationic terminals during cationic polymerization reaction because the hindered amine compound used in the invention has steric hindrance in contrast to conventionally-used basic compounds. Thus, the hindered amine compound used in the invention does not inhibit the progress of polymerization, and thus causes no decrease in sensitivity.

Additionally, it was experimentally shown that HALS (Hindered Amine Light Stabilizer), a commercially available hindered amine as a light stabilizer, causes greater reduction in sensitivity than the (a) hindered amine compound having the specific structure for use in the invention. Although details of the reason why such a greater reduction in sensitivity is caused are not yet clear, the greater reduction is thought to be caused due to the presence of a polar moiety, such as an ester group, in a molecule.

The hindered amine compound having the specific structure has, in a molecule thereof, no nucleophilic moiety other than the basic nitrogen atom(s), and is a compound constituted of carbon atoms, hydrogen atoms and one or more nitrogen atoms.

The hindered amine compound having the specific structure is preferably a compound represented by any one of the following Formulae I to VII.

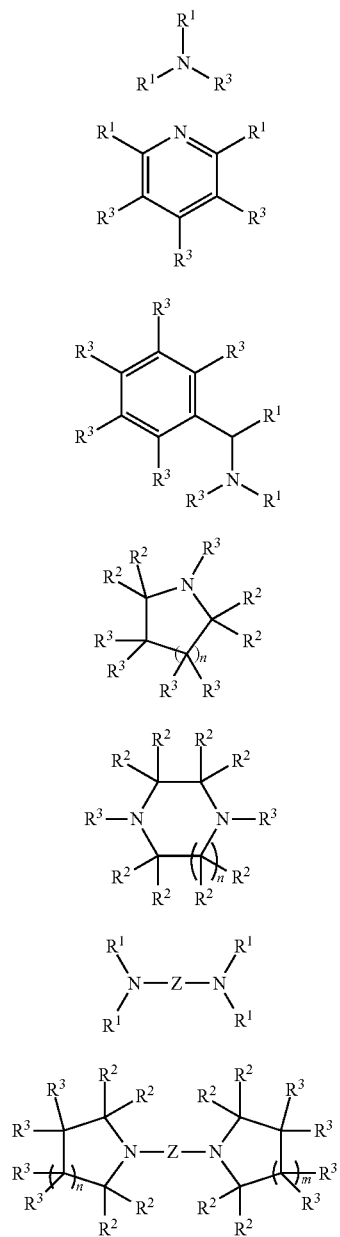

R[1] represents a branched alkyl group having 3 to 8 carbon atoms, a cycloalkyl group having 3 to 10 carbon atoms or an aralkyl group having 7 to 20 carbon atoms. R[2] represents a linear alkyl group having 1 to 4 carbon atoms, a branched alkyl group having 3 to 6 carbon atoms or an aryl group having 6 to 12 carbon atoms. R[3] represents a hydrogen atom, a linear alkyl group having 1 to 20 carbon atoms, a branched alkyl group having 3 to 6 carbon atoms, a cycloalkyl group having 3 to 10 carbon atoms, an aryl group having 6 to 12 carbon atoms, an aralkyl group having 7 to 20 carbon atoms or an alkenyl group having 2 to 20 carbon atoms. The two or more groups respectively represented by R[1]s in one molecule may be the same or different, and may be bonded with each other to form a ring structure. The two or more groups respectively represented by R[2]s in one molecule may also be the same or different, and may be bonded with each other to form a ring structure. Z represents a divalent organic group formed of hydrocarbons. n and m each represent an integer from 1 to 3.

Preferable examples of the branched alkyl group having 3 to 8 carbon atoms and being represented by R[1] include an isopropyl group, an isobutyl group, a tert-butyl group, an isopentyl group, a 2-methylbutyl group, a neopentyl group, a 4-methylpentyl group, a 3-methylpentyl group, a 2-methylpentyl group, a 3,3,-dimethylbutyl group, a 1,1-dimethylbutyl group, a 1,3-dimethylbutyl group, a 2,3-dimethylbutyl group, a 1-ethylbutyl group, a 1-ethyl-2-methyl-propyl group, a 1-methyl-1-ethylpropyl group, a 1-methyl-2-ethylpropyl group, a 2-methyl-1-ethylpropyl group and a 2-methyl-2-ethylpropyl group. Of these groups, isopropyl, isobutyl, tert-butyl, isopentyl, 2-methylbutyl and neopentyl groups are more preferable.

Preferable examples of the cycloalkyl group having 3 to 10 carbon atoms and being represented by R[1] include a cyclopropyl group, a cyclobutyl group, a cyclopentyl group, a cyclohexyl group and a norbornyl group. Of these groups, cyclopentyl, cyclohexyl and norbornyl groups are more preferable.

Preferable examples of the aralkyl group having 7 to 20 carbon atoms and being represented by R[1] are substituted and unsubstituted aralkyl groups including a benzyl group, an α-methylbenzyl group, an α-ethylbenzyl group, a phenethyl group, an α-methylphenethyl group, a β-methylphenethyl group, an α,α-dimethylbenzyl group, a 4-methylphenethyl group, a 4-methylbenzyl group, a 3-methylbenzyl group, a 2-methylbenzyl group, a 4-ethylbenzyl group, a 2-ethylbenzyl group, a 4-isopropylbenzyl group, a 4-tert-butylbenzyl group, a 2-tert-butylbenzyl group, a 4-tert-pentylbenzyl group, a 4-cyclohexylbenzyl group, a 4-n-octylbenzyl group, a 4-tert-octylbenzyl group, a 4-allylbenzyl group, a 4-benzylbenzyl group, a 4-phenethylbenzyl group, a 4-phenylbenzyl group, a 4-(4'-methylphenyl)benzyl group, a 2-furfuryl group, a diphenylmethyl group, a 1-naphthylmethyl group and 2-naphthylmethyl group. Of these groups, benzyl, α-methylbenzyl, α-ethylbenzyl, phenethyl and α-methylphenethyl groups are more preferable.

Preferable examples of the linear alkyl group having 1 to 4 carbon atoms and being represented by R[2] include a methyl group, an ethyl group, a butyl group and a propyl group.

Preferable examples of the branched alkyl group having 3 to 6 carbon atoms and being represented by R[2] include an isopropyl group, an isobutyl group, a tert-butyl group, an isopentyl group, a 2-methylbutyl group, a neopentyl group, a 4-methylpentyl group, a 3-methylpentyl group, a 2-methylpentyl group, a 3,3-dimethylbutyl group, a 1,1-dimethylbutyl group, a 1,3-dimethylbutyl group, a 2,3-dimethylbutyl group, a 1-ethylbutyl group, a 1-ethyl-2-methylpropyl group, a 1-methyl-1-ethylpropyl group, a 1-methyl-2-ethylpropyl group, a 2-methyl-1-ethylpropyl group and a 2-methyl-2-ethylpropyl group. Of these groups, isopropyl, isobutyl, tert-butyl, isopentyl, 2-methylbutyl and neopentyl groups are more preferable.

Preferable examples of the aryl group having 6 to 12 carbon atoms and being represented by R[2] include a phenyl group, a tolyl group, a xylyl group, a 4-ethylphenyl group, a 4-tert-butylphenyl group and a naphthyl group.

Preferable examples of the linear alkyl group having 1 to 20 carbon atoms and being represented by R[3] include a methyl group, an ethyl group, a propyl group, a butyl group, a pentyl group, a hexyl group, a heptyl group, an octyl group, a nonyl group, a decyl group, a dodecyl group, a hexadecyl group and an octadecyl group. Of these groups, an octyl group, a nonyl group, a decyl group, a dodecyl group, a hexadecyl group and an octadecyl group are more preferable.

Preferable examples of the linear alkenyl group having 2 to 20 carbon atoms and being represented by $R^3$ include a vinyl group, an allyl group, a 1-propenyl group, an isopropenyl group, a 1-butenyl group, a 2-butenyl group, a 3-butenyl group, a 2-methyl-1-propenyl group, a 2-methylallyl group, a 1-methyl-1-propenyl group, a 1-methylallyl group, a 1-pentenyl group, a 2-pentenyl group and 1-hexenyl group. Of these groups, an allyl group, a 1-propenyl group, an isopropenyl group, a 1-butenyl group and a 2-butenyl group are more preferable.

The branched alkyl group having 3 to 6 carbon atoms and being represented by $R^3$, the cycloalkyl group having 3 to 10 carbon atoms and being represented by $R^3$, the aryl group having 6 to 12 carbon atoms and being represented by $R^3$ and the aralkyl group having 7 to 20 carbon atoms and being represented by $R^3$ respectively have the same meanings and same preferred ranges of those represented by $R^1$ or $R^2$, respectively.

The divalent organic group with hydrocarbon refers to a divalent organic group having 1 to 30 carbon atoms. In this case, the scope of the divalent organic group includes both an aliphatic group and an aromatic group. The aliphatic group may be a linear or cyclic, saturated or unsaturated divalent aliphatic hydrocarbon group. The number of carbon atoms contained therein is in a range of 1 to 30, and is preferably in a range of 2 to 22. The unsaturated aliphatic group may be an aliphatic group having a double bond or a triple bond. The scope of the divalent aromatic group includes a divalent hydrocarbon group derived from a monocyclic aromatic hydrocarbon having one benzene ring (such as benzene, toluene or xylene) and a divalent hydrocarbon group derived from a polycyclic aromatic hydrocarbon having two or more of benzene rings (such as naphthalene, biphenyl or terphenyl), which generally having 2 to 4 benzene rings.

Each of the groups recited above may have a substituent formed of hydrocarbon when the substituent can be introduced thereinto.

Examples of the (a) hindered amine compound having the specific structure which can be used suitably in the invention include Compounds (A-1) to (A-49) illustrated below, while these compounds should not be construed as limiting the scope of the invention.

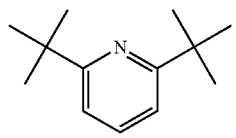

A-1

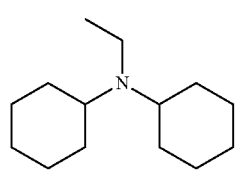

A-2

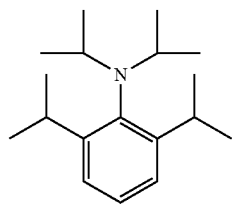

A-3

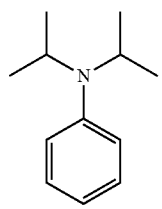

A-4

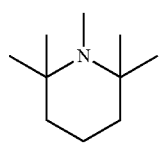

A-5

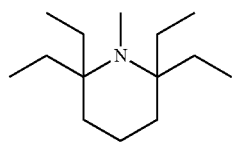

A-6

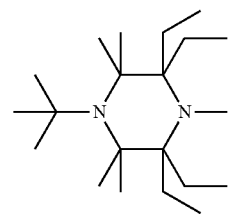

A-7

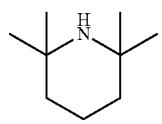

A-8

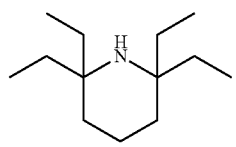

A-9

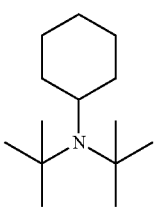

A-10

A-11

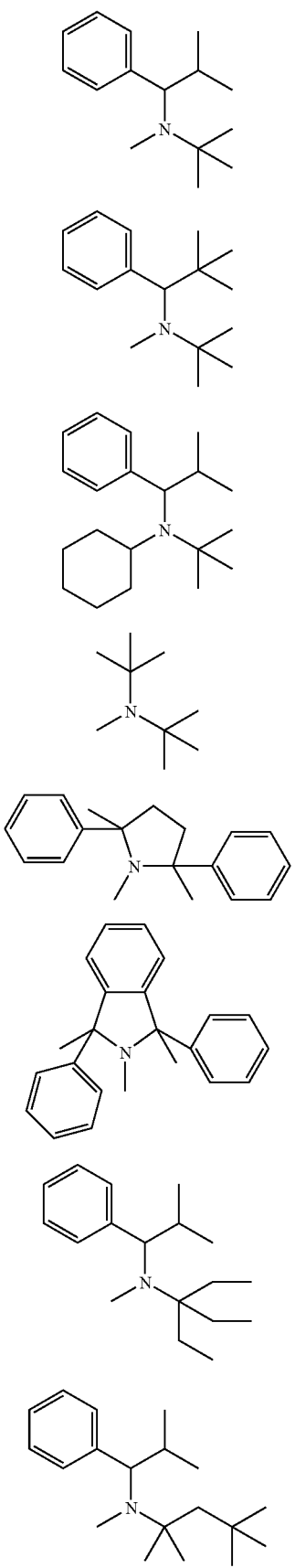
A-12
A-13
A-14
A-15
A-16
A-17
A-18
A-19
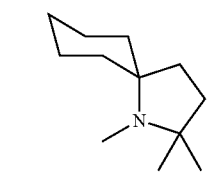
A-20
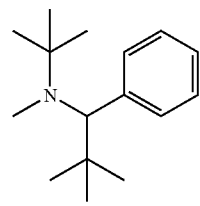
A-21
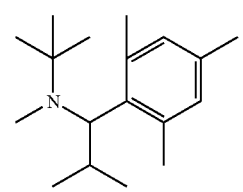
A-22
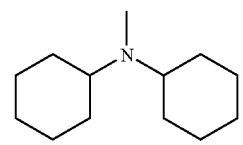
A-23
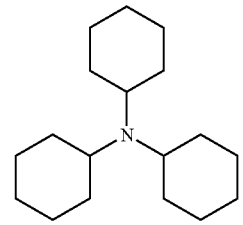
A-24
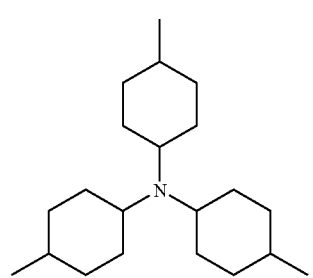
A-25
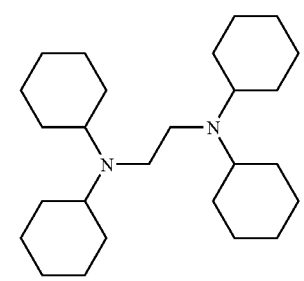
A-26

A-27
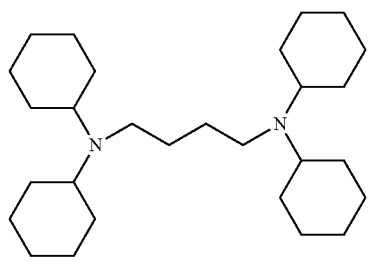
A-28
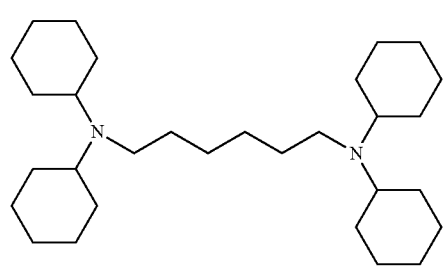
A-29
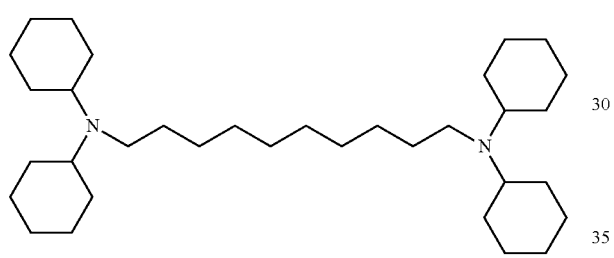
A-30
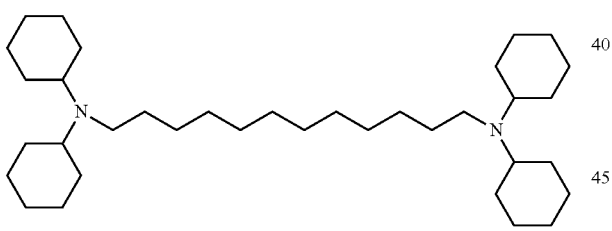
A-31
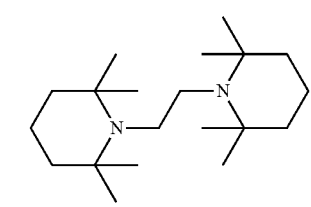
A-32
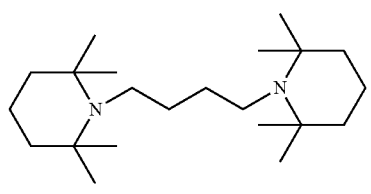
A-33
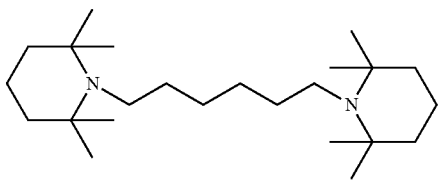
A-34
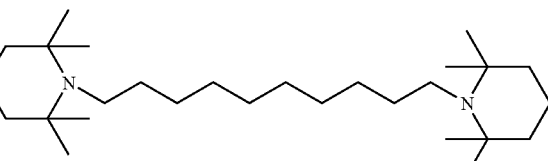
A-35
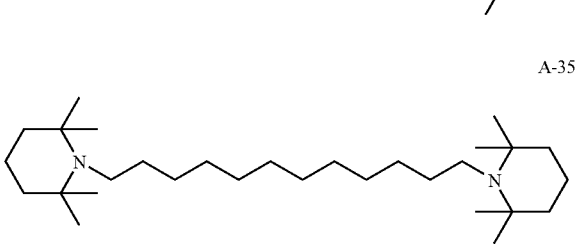
A-36
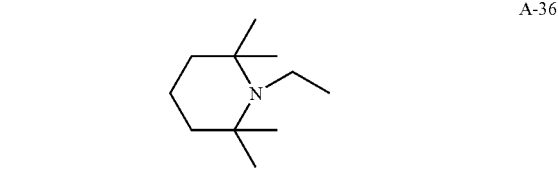
A-37
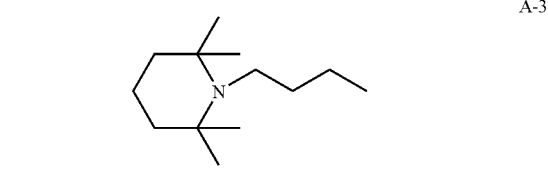
A-38
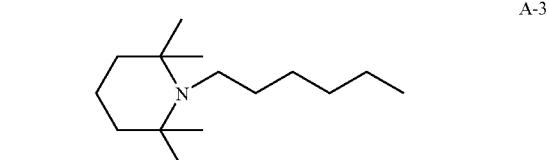
A-39
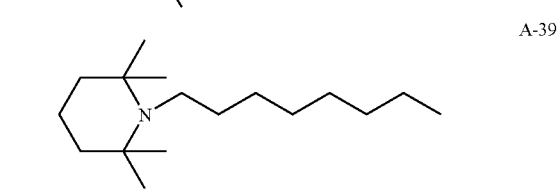
A-40
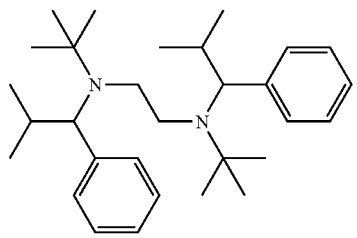

A-41 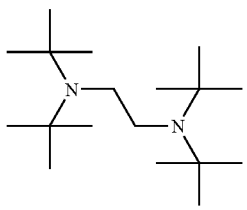

A-42 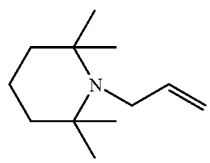

A-43 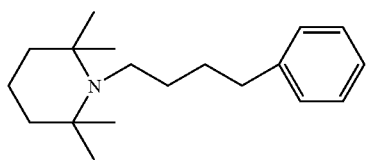

A-44 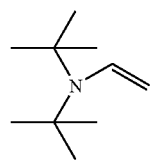

A-45 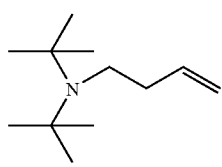

A-46 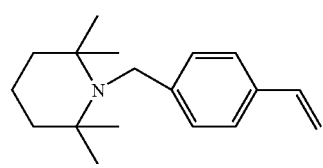

A-47 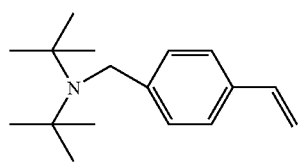

A-48 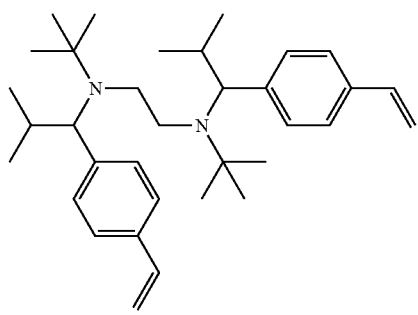

A-49 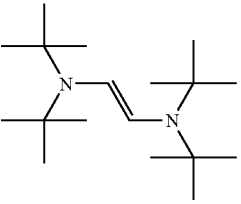

Among the above compounds (or among the compounds represented by any one of Formulae I to VII), the compounds represented by Formula VI or VII are more preferable, and Compounds (A-26) to (A-35) are specifically preferable from the viewpoints of elution property, volatility and odor.

The addition amount of the (a) hindered amine compound having the specific structure is suitably in a range of 0.05 to 20% by mass, preferably in a range of 0.1 to 15% by mass, and more preferably in a range of 0.5 to 10% by mass, based on the total amount of the composition. By adjustment of the addition amount to the range specified above, the composition can achieve stability against light and heat while reducing a decrease in sensitivity to be minimum.

In the radiation-curable polymerizable composition of the invention, the (a) hindered amine compound having the specific structure may be singly used, or alternatively, two or more thereof may be used in combination.

It is also possible to additionally use other hindered amine compounds used widely as general light stabilizers in combination with the (a) hindered amine compound having the specific structure as long as the effect of the invention is not ruined by the addition. Examples of other hindered amine compounds which can be used in the invention in combination with the (a) hindered amine compound having the specific structure include the followings:

Bis(1,2,2,6,6-pentamethyl-4-piperidyl)sebacate (available as "TINUVIN® 765" (manufactured by Ciba Specialty Chemicals Inc.,) or as "SANOL LS-765" (trade name, manufactured Sankyo Co., Ltd.)), bis(2,2,6,6,-tetramethyl-4-piperidyl)sebacate (available as "TINUVIN® 770" from Ciba Specialty Chemicals Inc., or under the name of "SANOL LS-770" from Sankyo Co., Ltd.), 2,2,6,6-tetramethyl-4-piperidyl benzoate (available under the trade name of "SANOL LS-744" from Sankyo Co., Ltd.), 1,2,2,6,6-pentamethyl-4-piperidyl methacrylate (available under the trade name of "ADEKASTAB LA-82" from Asahi Denka Kogyo K.K.), 2,2,6,6-tetramethyl-4-piperidyl methacrylate (available under the trade name of "ADEKASTAB LA-87" from Asahi Denka Kogyo K.K.), 1-[2-{3-(3,5-di-tert-butyl-4-hydroxyphenyl)propionyloxy}ethyl]-4-[3-(3,5-di-tert-butyl-4-hydroxyphenyl)propionyloxy]-2,2,6,6-tetramethylpiperidine (available under the trade name of "SANOL LS-2626" from Sankyo Co., Ltd.), bis(1,2,2,6,6-pentamethyl-4-piperidyl) 2-n-butyl-2-(3,5-di-tert-butyl-4-hydroxybenzyl)malonate (available as "TINUVIN® 144" from Ciba Specialty Chemicals Inc.), bis(1,2,2,6,6-pentamethyl-4-piperidyl) 4-methoxybenzilidenemalonate (available under the trade name of "SANDUVOR PR-31" from Clariant), 2",2",6",6"-tetramethylcyclododecanespiro-2'-oxazolidine-5'-spiro-4"-piperazine-4'-one (or sometimes referred to as 1-oxa-3,8-diaza-2-undecamethylino-4-oxo-7,7,9,9-tetramethylspiro[4.5]decane, available under the trade name of "HOSTAVIN N 20" from Hoechst AG), 8-acetyl-3-dodecyl-7,7,9,9-tetramethyl-1,3,8-triazaspiro[4.5]decane-2,4-dione (available under the trade name of "SANOL LS-440" from Sankyo Co., Ltd.), tetrakis(1,2,2,6,6-pentamethyl-4-piperidyl) 1,2,3,4-butanetetracarboxylate (available under the trade name of "ADEKASTAB LA-52" from Asahi Denka Kogyo K.K.), tetrakis(2,2,6,6-tetramethyl-4-piperidyl) 1,2,3,4-butanetetracarboxylate (available under the trade name of "ADEKASTAB LA-57" from Asahi Denka Kogyo K.K.), an ester mixture obtained by esterification reaction of 1,2,3,4-butanetetracarboxylic acid with 1,2,2,6,6-pentamethyl-4-piperidinol and 1-tridecanol (available under the trade name of "ADEKASTAB LA-62" from Asahi Denka Kogyo K.K.), an ester mixture obtained by esterification reaction of 1,2,3,4-butanetetracarboxylic acid with 2,2,6,6-tetramethyl-4-piperidinol and 1-tridecanol (available under the trade name of "ADEKASTAB LA-67" from Asahi Denka Kogyo K.K.), an ester mixture obtained by esterification reaction of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane (available under the trade name of "ADEKASTAB LA-63" from Asahi Denka Kogyo K.K.), an ester mixture obtained by esterification reaction of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane (available under the trade name of "ADEKASTAB LA-68" from Asahi Denka Kogyo K.K.), a polycondensate of dimethyl succinate and 1-(2-hydroxyethyl)-4-hydroxy-2,2,6,6-tetramethylpiperidine (or sometimes designated as a 4-hydroxy-2,2,6,6-tetramethyl-1-piperidinoethanol/succinic acid copolymer, available as "TINUVIN® 622" from Ciba Specialty Chemicals Inc.), a polycondensate of N,N'-bis(2,2,6,6-tetramethyl-4-piperidyl) hexamethylenediamine and 1,2-dibromoethane (or sometimes designated as poly[N,N'-di(2,2,6,6-tetramethyl-4-piperidyl)hexamethylenediamino-N'-ethylene], available under the trade name of "SPINUVEX A-36" from Montefluos), poly[{6-(1,1,3,3-tetramethylbutyl)imino-1,3,5-triazine-2,4-diyl}{(2,2,6,6-tetramethyl-4-piperidyl) imino}hexamethylene{2,2,6,6-tetramethyl-4-piperidyl}imino]] (available as "CHIMASSORB® 944" from Ciba Specialty Chemicals Inc.) and poly[(6-morpholino-1,3,5-triazine-2,4-yl){(2,2,6,6-tetramethyl-4-piperidyl)imino}hexamethylene{(2,2,6,6-tetramethyl-4-piperidyl)imino}] (available under the trade name of "CYASORB® UV 3346 " from American Cyanamid).

The preferable addition amount of these other hindered amine compounds is from 0.01 to 10% by mass, preferably from 0.02 to 8% by mass, and is particularly preferably from 0.05 to 5% by mass, based on an amount of the (a) hindered amine compound having the specific structure.

(b) Photo-Acid Generating Agent

The radiation-curable polymerizable composition of the invention includes a photo-acid generating agent. The term "photo-acid generating agent" refers to a compound which generates an acid by being exposed to radiation.

The photo-acid generating agent used in the invention can be appropriately selected from the group consisting of photo-initiators of cationic photopolymerization, photo-initiators of radical photopolymerization, photodecoloring agents for dyes, photodiscoloring agents, or compounds capable of generating acids by exposure to radiation generally used for microplanographic resist or the like, such as light (400- to 200-nm ultraviolet and far-ultraviolet rays, particularly preferably a g-ray, an h-ray, an i-ray and KrF excimer laser light), ArF excimer laser light, electron beams, X-rays, molecular beams or ion beams.

Examples of the photo-acid generating agent include: onium salts that generate acids through decomposition upon exposure to radiation, such as diazonium salts, ammonium salts, phosphonium salts, iodonium salts, sulfonium salts, selenonium salts or arsonium salts, organic halogenated compounds, organometal/organic halide compounds; photo-acid generating agents having o-nitrobenzyl type protective groups; and compounds which generate sulfonic acid through photolysis such as iminosulfonate; disulfone compounds; diazoketosulfone; and diazodisulfone compounds.

Examples of other compound which generates acid upon irradiation with actinic rays or radiation and can be used in the invention include: onium salts such as diazonium salts as described, e.g., in S. I. Schlesinger, Photogr. Sci. Eng., 18, 387(1974) and T. S. Bal et al., Polymer, 21, 423 (1980), the ammonium salts disclosed, e.g., in U.S. Pat. Nos. 4,069,055, 4,069,056 and Re 27,992, and JP-A No. 3-140140, the phosphonium salts described, e.g., in D. C. Necker et al., Macromolecules, 17, 2468(1984), C. S. Wen et al., Teh. Proc. Conf. Rad. Curing ASIA, p. 478, Tokyo, October(1988) and U.S. Pat. Nos. 4,069,055 and 4,069,056, the iodonium salts described, e.g., in J. V. Crivello et al., Macromolecules, 10(6), 1307(1977), Chem. & Eng. News, November 28, p. 31(1988), European Patent Nos. 104,143, 339,049 and 410,201, JP-A Nos. 2-150848 and 2-296514, the sulfonium salts described, e.g., in J. V. Crivello et al., Polymer J., 17, 73(1985), J. V. Crivello et al., J. Org. Chem., 43, 3055(1978), W. R. Watt et al., J. Polymer Sci., Polymer Chem. Ed., 22, 1789(1984), J. V. Crivello et al., Polymer Bull., 14, 279(1985), J. V. Crivello et al., Macromolecules, 14(5), 1141(1981), J. V. Crivello et al., J. Polymer Sci., Polymer Chem. Ed., 17, 2877(1979), European Patent Nos. 370, 693, 161,811, 410,201, 339,049, 233,567, 297,443 and 297, 442, U.S. Pat. Nos. 3,902,114, 4,933,377, 4,760,013, 4,734, 444 and 2,833,827, German Patent Nos. 2,904,626, 3,604, 580 and 3,604,581, JP-A Nos. 7-28237 and 8-27102, the selenonium salts described, e.g., in J. V. Crivello et al., Macromolecules, 10(6), 1307(1977) and J. V. Crivello et al., J. Polymer Sci., Polymer Chem. Ed., 17, 1047(1979), and the arsonium salts described, e.g., in C. S. Wen et al., Teh. Proc. Conf. Rad. Curing ASIA, p. 478, Tokyo, October(1988); the organic halogenated compounds disclosed, e.g., in U.S. Pat. No. 3,905,815, Japanese Patent Application Publication (JP-B) No. 46-4605, JP-A Nos. 48-36281, 55-32070, J60-239736, 61-169835, 61-169837, 62-58241, 62-212401, 63-70243 and 63-298339; the organometal/organic halide compounds described, e.g., in K. Meier et al., J. Rad. Curing, 13(4), 26(1986), T. P. Gill et al., Inorg. Chem., 19, 300(1980), D. Astruc, Acc. Chem. Res., 19(2), 377(1896), and JP-A No. 2-161445;

the photo-acid generating agents having o-nitrobenzyl type protective groups described, e.g., in S. Hayase et al., J. Polymer Sci., 25, 753(1987), E. Reichmanis et al., J. Polymer Sci., Polymer Chem. Ed., 23, 1(1985), Q. Q. Zhu et al., J. Photochem., 36, 85, 39, 317(1987), B. Amit et al., Tetrahedron Lett., (24), 2205(1973), D. H. R. Barton et al., J. Chem. Soc., 3571(1965), P. M. Collins et al., J. Chem. Soc., Perkin I, 1695(1975), M. Rudinstein et al., Tetrahedron Lett., (17), 1445(1975), J. W. Walker et al., J. Am. Chem. Soc., 110, 7170(1988), S. C. Busman et al., J. Imaging Technol., 11(4), 191(1985), H. M. Houlihan et al., Macromolecules, 21, 2001 (1988), P. M. Collins et al., J. Chem. Soc., Chem. Commun., 532(1972), S. Hayase et al., Macromolecules, 18, 1799(1985), E. Reichmanis et al., J. Electrochem. Soc., Solid State Sci. Technol., 130(6), F. M. Houlihan et al., Macromolecules, 21, 2001(1988), European Patent Nos. 0,290,750, 046,083, 156,535, 271,851 and 0,388,343, U.S. Pat. Nos. 3,901,710 and 4,181,531, JP-A Nos. 60-198538 and 53-133022;

the compounds that generate sulfonic acids through photolysis such as the iminosulfonates, as described, e.g., in M. Tunooka et al., Polymer Preprints Japan, 35(8), G. Berner et al., J. Rad. Curing, 13(4), W. J. Mijs et al., Coating Technol., 55(697), 45(1983), Akzo, H. Adachi et al., Polymer Preprints Japan, 37(3), European Patent Nos. 0,199,672, 084,515, 044, 115, 618,564 and 0,101,122, U.S. Pat. Nos. 4,371,605 and 4,431,774, JP-A Nos. 64-18143, 2-245756 and 3-140109; the disulfone compounds disclosed, e.g., in JP-A Nos. 61-166544 and 2-71270; and the diazoketosulfone and diazodisulfone compounds disclosed, e.g., in JP-A Nos. 3-103854, 3-103856 and 4-210960.

Examples of the photo-acid generating agent further include a polymeric compound prepared by introducing, into a main or side chain thereof, the group(s) or the compound(s) described above as generating an acid by being exposed to light. Examples of the polymeric compound include the compounds described, e.g., in M. E. Woodhouse et al., J. Am. Chem. Soc., 104, 5586(1982), S. P. Pappas et al., J. Imaging Sci., 30(5), 218(1986), S. Kondo et al., Makromol. Chem., Rapid Commun., 9, 625(1988), Y. Yamada et al., Makromol. Chem., 152, 153, 163(1972), J. V. Crivello et al., J. Polymer Sci., Polymer Chem. Ed., 17, 3845(1979), U.S. Pat. No. 3,849,137, German Patent No. 3,914,407, JP-A Nos. 63-26653, 55-164824, 62-69263, 63-146038, JP-A Nos. 63-163452, 62-153853 and 63-146029.

Examples of the photo-acid generating agent further include a compound capable of generating an acid upon exposure to light such as those described in N. R. Pillai, Synthesis, (1), 1(1980), A. Abad et al., Tetrahedron Lett., (47) 4555 (1971), D. H. R. Barton et al., J. Chem. Soc., (C), 329(1970), U.S. Pat. No. 3,779,778 and European Patent No. 126,712.

Preferable examples of the compound which can be used as the photo-acid generating agent in the invention include compounds represented by any one of the following Formulae (b1), (b2) and (b3).

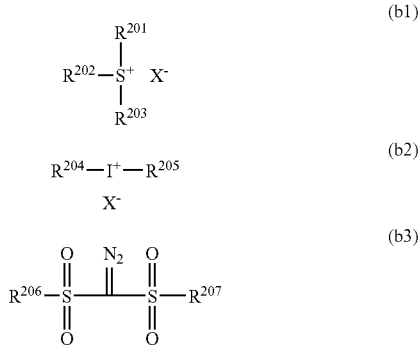

In Formula (b1), $R^{201}$, $R^{202}$ and $R^{203}$ each independently represent an organic group.

$X^-$ represents a non-nucleophilic anion, and examples thereof include a sulfonic anion, a carboxylic acid anion, a bis(alkylsulfonyl)amide anion, a tris(alkylsulfonyl)methide anion, $BF_4^-$, $PF_6^-$, $SbF_6^-$, and groups illustrated below. Preferable examples thereof include an organic anion having carbon atoms.

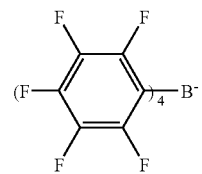

Preferable examples of the organic anion include the organic anions represented by any one of the following Formulae.

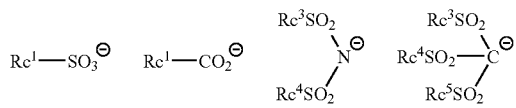

$Rc^1$ represents an organic group.

Examples of the organic group represented by $Rc^1$ include groups having 1 to 30 carbon atoms, and preferable examples thereof include an alkyl group, a cycloalkyl group, an aryl group and a group formed by combining two or more of these groups via a linkage group(s) such as a single bond, —O—, —$CO_2$—, —S—, —$SO_3$— or —$SO_2N(Rd^1)$—, in which $Rd^1$ represents a hydrogen atom or an alkyl group.

$Rc^3$, $Rc^4$ and $Rc^5$ each independently represent an organic group.

Preferable examples of the organic group represented by $Rc^3$, $Rc^4$ and $Rc^5$ each include the same ones as the organic group represented by $Rc^1$, and the organic groups most preferable as $Rc^3$, $Rc^4$ and $Rc^5$ are perfluoroalkyl groups having 1 to 4 carbon atoms.

$Rc^3$ and $Rc^4$ may be bonded with each other to form a ring. Examples of a group formed by bonding $Rc^3$ and $Rc^4$ include an alkylene group and an arylene group, and preferable examples thereof include a perfluoroalkylene group having 2 to 4 carbon atoms.

The most preferable examples of the organic group represented by any one of $Rc^1$ and $Rc^3$ to $Rc^5$ include an alkyl group having, at the 1-position thereof, a fluorine atom or a fluoroalkyl group as a substituent, and a phenyl group having a fluorine atom or a fluoroalkyl group as a substituent. The acidity of the acid generated by light irradiation to the photo-acid generating agent is raised when the organic group of the photo-acid generating agent has such a fluorine atom or a fluoroalkyl group, so that the sensitivity of the polymerizable compound is enhanced.

The number of carbon atoms in the organic group represented by any one of $R^{201}$, $R^{202}$ and $R^{203}$ in Formula (b1) is generally from 1 to 30, and is preferably from 1 to 20.

Any two of $R^{201}$ to $R^{203}$ may be bonded with each other to form a ring structure, and the thus-formed ring structure may have an oxygen atom, a sulfur atom, an ester bond, an amide bond and/or a carbonyl group. Examples of the group formed by bonding any two of $R^{201}$ to $R^{203}$ include an alkylene group (such as a butylene group or a pentylene group).

Specific examples of the organic group represented by $R^{201}$, $R^{202}$ or $R^{203}$ include their corresponding groups in compounds (b1-1), (b1-2) or (b1-3) respectively illustrated hereinafter.

The photo-acid generating agent may be a compound having plural structures, each of which is represented by Formula (b1). Examples of such photo-acid generating agent include a compound having a structure that at least one of $R^{201}$ to $R^{203}$ in one compound represented by Formula (b1) is bonded directly or via a linkage group to at least one of $R^{201}$ to $R^{203}$ in another compound represented by Formula (b1).

More preferable examples of the compounds represented by Formula (b1) include compounds (b1-1), (b1-2) and (b1-3) illustrated hereinafter.

Compound (b1-1) is an arylsulfonium compound represented by the foregoing Formula (b1) in which at least one of $R^{201}$ to $R^{203}$ is an aryl group. Namely, compound (b1-1) is a compound having an arylsulfonium as a cation.

In the arylsulfonium compound, all of $R^{201}$ to $R^{203}$ may be aryl groups, or at least one of $R^{201}$ to $R^{203}$ may be an aryl group and the remainders may be an alkyl group(s) or a cycloalkyl group(s).

Examples of the arylsulfonium compound include a triarylsulfonium compound, a diarylalkylsulfonium compound, an aryldialkylsulfonium compound, a diarylcycloalkylsulfonium compound and an aryldicycloalkylsulfonium compound.

Preferable examples of the aryl group in the arylsulfonium compound include an aryl group such as a phenyl group or a naphthyl group, and a heteroaryl group such as an indole residue or a pyrrole residue. Among these groups, a phenyl group and an indole residue are more preferable. When the arylsulfonium compound has two or more aryl groups, these aryl groups may be the same or different from each other.

The alkyl group which is possessed by the arylsulfonium compound as needed is preferably a linear or branched alkyl group having 1 to 15 carbon atoms, and examples thereof include a methyl group, an ethyl group, a propyl group, an n-butyl group, a sec-butyl group and a t-butyl group.

The cycloalkyl group which is possessed by the arylsulfonium compound as needed is preferably a cycloalkyl group having 3 to 15 carbon atoms, and examples thereof include a cyclopropyl group, a cyclobutyl group and a cyclohexyl group.

The aryl group, the alkyl group or the cycloalkyl group represented by $R^{201}$, $R^{202}$ or $R^{203}$ may have a substituent such as an alkyl group (e.g., an alkyl group having 1 to 15 carbon atoms), a cycloalkyl group (e.g., a cycloalkyl group having 3 to 15 carbon atoms), an aryl group (e.g., an aryl group having 6 to 14 carbon atoms), an alkoxy group (e.g., an alkoxy group having 1 to 15 carbon atoms), a halogen atom, a hydroxyl group or a phenylthio group. Examples of a preferable substituent include a linear or branched alkyl group having 1 to 12 carbon atoms, a cycloalkyl group having 3 to 12 carbon atoms, and a linear, branched or cyclic alkoxy group having 1 to 12 carbon atoms. Of these substituents, the alkyl group having 1 to 4 carbon atoms and the alkoxy group having 1 to 4 carbon atoms are more preferable. Any one, two or all of $R^{201}$ to $R^{203}$ may respectively have such a substituent. When any one of $R^{201}$ to $R^{203}$ which has a substituent is an aryl group, it is preferred that the substituent resides in the p-position of the aryl group.

Compound (b1-2) is a compound represented by Formula (b1) wherein $R^{201}$ to $R^{203}$ each independently represent an organic group having no aromatic ring. Herein, the term "aromatic ring" is intended to include aromatic rings containing hetero atoms also.

The organic group which has no aromatic ring and is represented by any one of $R^{201}$ to $R^{203}$ is generally an organic group having 1 to 30 carbon atoms, preferably an organic group having 1 to 20 carbon atoms.

Each of $R^{201}$ to $R^{203}$ preferably represents an alkyl group, a cycloalkyl group, an allyl group or a vinyl group, more preferably represents a linear, branched or cyclic 2-oxoalkyl group or an alkoxycarbonylmethyl group, and particularly preferably a linear or branched 2-oxoalkyl group.

The alkyl group represented by any one of $R^{201}$ to $R^{203}$ may be either linear or branched one, and preferable examples thereof include a linear or branched alkyl group having 1 to 10 carbon atoms (e.g., a methyl group, an ethyl group, a propyl group, a butyl group, or a pentyl group). Among these alkyl groups, a linear or branched 2-oxoalkyl group and an alkoxycarbonylmethyl group are more preferable.

The cycloalkyl group represented by any one of $R^{201}$ to $R^{203}$ is preferably a cycloalkyl group having 3 to 10 carbon atoms (such as a cyclopentyl group, a cyclohexyl group or a norbornyl group), and is more preferably a cyclic 2-oxoalkyl group.

Preferable examples of the linear, branched or cyclic 2-oxoalkyl group represented by any one of $R^{201}$ to $R^{203}$ include the alkyl groups as recited above which have >C=O in their respective 2-positions and the cycloalkyl groups as recited above which have >C=O in their respective 2-positions.

Preferable examples of the alkoxy group in the alkoxycarbonylmethyl group represented by any one of $R^{201}$ to $R^{203}$ include an alkoxy group having 1 to 5 carbon atoms (such as a methoxy group, an ethoxy group, a propoxy group, a butoxy group or a pentoxy group).

The organic group represented by any one of $R^{201}$ to $R^{203}$ may further be substituted with a halogen atom, an alkoxy group (such as an alkoxy group having 1 to 5 carbon atoms), a hydroxyl group, a cyano group or a nitro group.

Compound (b1-3) is a compound represented by the following Formula (b1-3), which is a compound having a phenacylsulfonium salt structure.

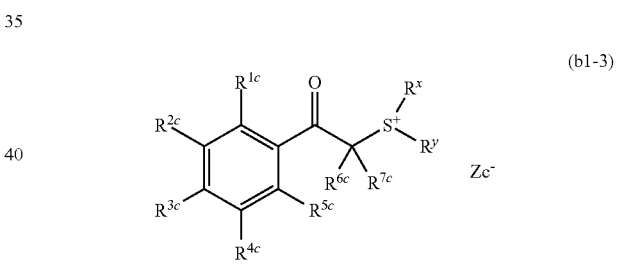

(b1-3)

In Formula (b1-3), $R^{1c}$ to $R^{5c}$ each independently represent a hydrogen atom, an alkyl group, a cycloalkyl group, an alkoxy group or a halogen atom.

$R^{6c}$ and $R^{7c}$ each independently represent a hydrogen atom, an alkyl group or a cycloalkyl group.

$R^x$ and $R^y$ each independently represent an alkyl group, a cycloalkyl group, an allyl group or a vinyl group.

Any two or more of $R^{1c}$ to $R^{5c}$, any two or more of $R^{6c}$ and $R^{7c}$, and two or more of $R^x$ and $R^y$ may be respectively bonded with each other to form a ring structure.

$Zc^-$ represents a non-nucleophilic anion, and examples thereof include the same non-nucleophilic anions as those represented by $X^-$ in Formula (b1).

The alkyl group represented by each of $R^{1c}$ to $R^{7c}$ may have either a linear form or a branched form. Examples thereof include a linear or branched alkyl group having 1 to 20 carbon atoms, and preferable examples thereof include a linear or branched alkyl group having 1 to 12 carbon atoms (such as a methyl group, an ethyl group, a linear or branched propyl group, a linear or branched butyl group, or a linear or branched pentyl group).

The cycloalkyl group represented by each of $R^{1c}$ to $R^{7c}$ is preferably a cycloalkyl group having 3 to 8 carbon atoms (such as a cyclopentyl group or a cyclohexyl group).

The alkoxy group represented by each of $R^{1c}$ to $R^{5c}$ may have a linear or branched form, and examples thereof include an alkoxy group having 1 to 10 carbon atoms, and preferable examples thereof include a linear or branched alkoxy group having 1 to 5 carbon atoms (such as a methoxy group, an ethoxy group, a linear or branched propoxy group, a linear or branched butoxy group, or a linear or branched pentoxy group), and a cyclic alkoxy group having 3 to 8 carbon atoms (such as a cyclopentyloxy group or a cyclohexyloxy group).

Examples of the group (ring structure) formed by a combination of any two or more of $R^{1c}$ to $R^{5c}$, a combination of $R^{6c}$ and $R^{7c}$, or a combination of $R^x$ and $R^y$ include a butylene group and a pentylene group. The thus-formed ring structure may have an oxygen atom, a sulfur atom, an ester bond or an amide bond.

It is preferable that at least one of $R^{1c}$ to $R^{5c}$ is a linear or branched alkyl group, a cycloalkyl group or a linear, branched or cyclic alkoxy group. It is further preferable that the total number of carbon atoms included in $R^{1c}$ to $R^{5c}$ is from 2 to 15. When the condition(s) are satisfied, the photo-acid generating agent may be further improved in terms of the solubility to a solvent and in terms of the prevention of generation of particles thereof during storage.

Examples of the alkyl group or the cycloalkyl group represented by $R^x$ and/or $R^y$ include the same ones as represented by each of $R^{1c}$ to $R^{7c}$.

Each of $R^x$ and $R^y$ is preferably a 2-oxoalkyl group or an alkoxycarbonylmethyl group.

Examples of the 2-oxoalkyl group include groups having >C=O in the 2-positions of the alkyl group or the cycloalkyl group represented by $R^{1c}$ to $R^{5c}$.

Examples of an alkoxy moiety in the alkoxycarbonylmethyl group include the same ones as the alkoxy group represented by each of $R^{1c}$ to $R^{5c}$.

Each of $R^x$ and $R^y$ preferably represents an alkyl group having 4 or more carbon atoms or a cycloalkyl group having 4 or more carbon atoms, more preferably represents an alkyl group having 6 or more carbon atoms or a cycloalkyl group having 6 or more carbon atoms, and further preferably represents an alkyl group having 8 or more carbon atoms or a cycloalkyl group having 8 or more carbon atoms.

In Formulae (b2) and (b3), $R^{204}$ to $R^{207}$ each independently represent an aryl group, an alkyl group or a cycloalkyl group. $X^-$ represents a non-nucleophilic anion, and examples thereof include the same ones as represented by $X^-$ in Formula (b1).

The aryl group represented by each of $R^{204}$ to $R^{207}$ is preferably a phenyl group or a naphthyl group, and is more preferably a phenyl group.

The alkyl group represented by each of $R^{204}$ to $R^{207}$ may have either a linear form or a branched form, and preferable examples thereof include linear or branched alkyl groups having 1 to 10 carbon atoms (e.g., a methyl group, an ethyl group, a propyl group, a butyl group, a pentyl group). Preferable examples of the cycloalkyl group represented by each of $R^{204}$ to $R^{207}$ include a cycloalkyl group having 3 to 10 carbon atoms (such as a cyclopentyl group, a cyclohexyl group, or a norbornyl group).

Each of $R^{204}$ to $R^{207}$ may have a substituent, and examples thereof include an alkyl group (such as those having 1 to 15 carbon atoms), a cycloalkyl group (such as those having 3 to 15 carbon atoms), an aryl group (such as those having 6 to 15 carbon atoms), an alkoxy group (such as those having 1 to 15 carbon atoms), a halogen atom, a hydroxyl group and a phenylthio group.

Examples of the photo-acid generating agent (namely, a compound capable of generating an acid upon irradiation with actinic rays or radiation) which may be used in the invention further include compounds represented by any one of the following Formulae (b4), (b5) and (b6).

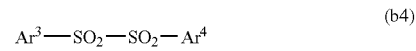

(b4)

(b5)

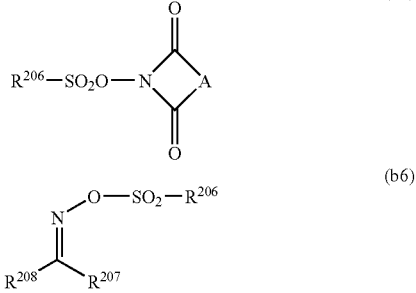

(b6)

In Formulae (b4) to (b6), $Ar^3$ and $Ar^4$ each independently represent an aryl group.

In Formulae (b5) and (b6), $R^{206}$, $R^{207}$ and $R^{208}$ each independently represent an alkyl group, a cycloalkyl group or an aryl group.

In Formula (b5), A represents an alkylene group, an alkenylene group or an arylene group.

Among the photo-acid generating agents illustrated above, the compounds represented by any one of Formulae (b1) to (b3) are preferably used in the invention.

Specific exemplary compounds (b-1) to (b-96), which are preferably used as the (b) photo-acid generating agent in the invention, are illustrated below, while these examples should not construed as limiting the scope of the invention.

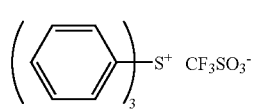

(b-1)

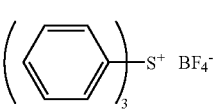

(b-2)

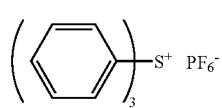

(b-3)

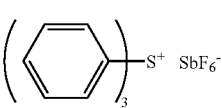

(b-4)

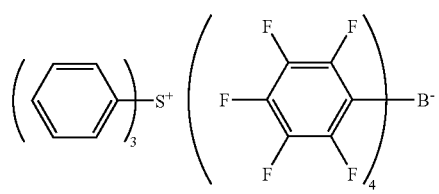 (b-5)
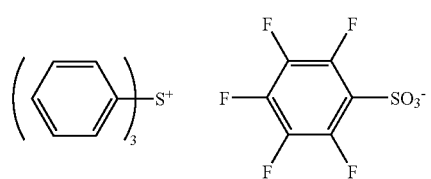 (b-7)
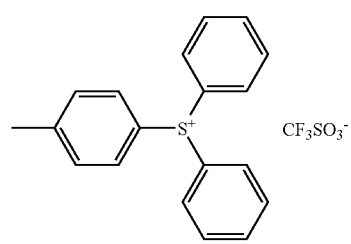 (b-9)
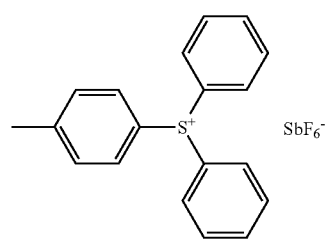 (b-11)
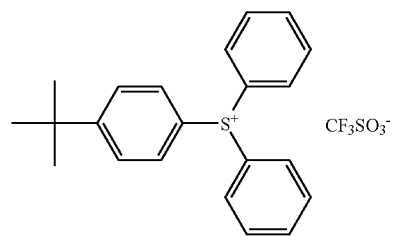 (b-13)
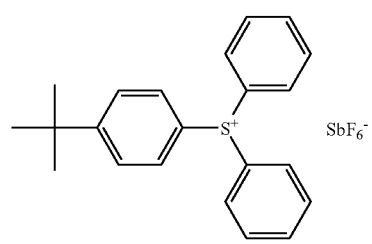 (b-15)
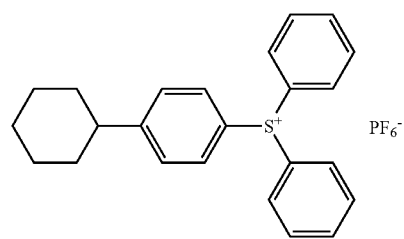 (b-17)
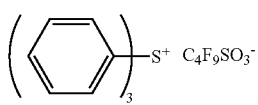 (b-6)
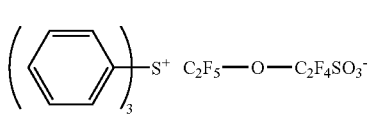 (b-8)
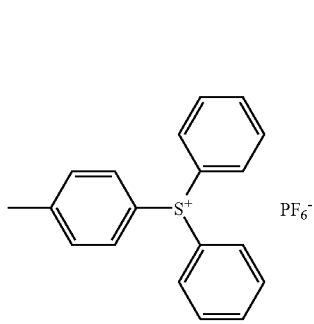 (b-10)
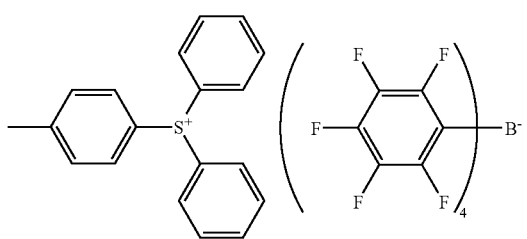 (b-12)
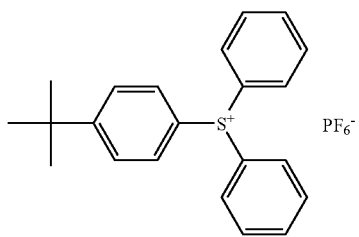 (b-14)
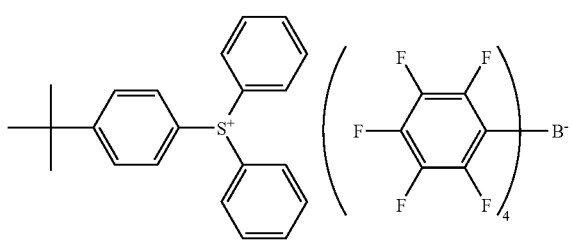 (b-16)
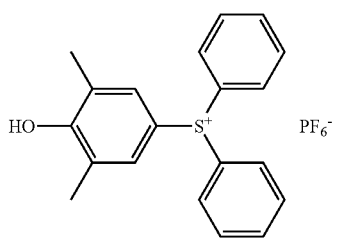 (b-18)

-continued
(b-19)
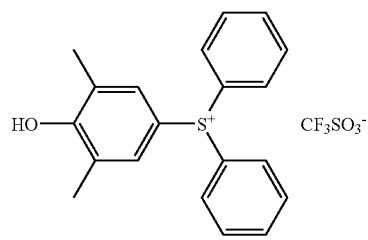 CF₃SO₃⁻
(b-20)
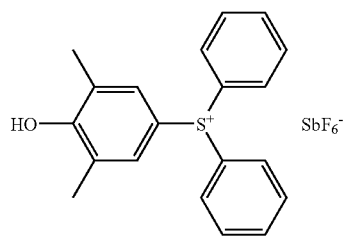 SbF₆⁻
(b-21)
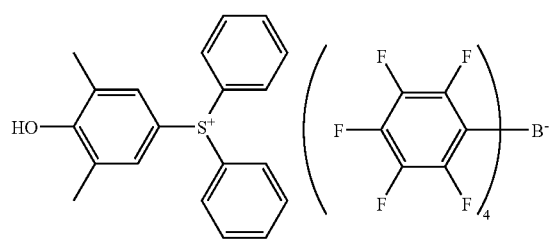
(b-22)
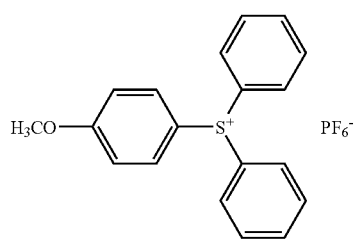 PF₆⁻
(b-23)
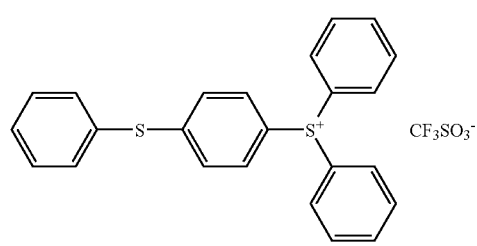 CF₃SO₃⁻
(b-24)
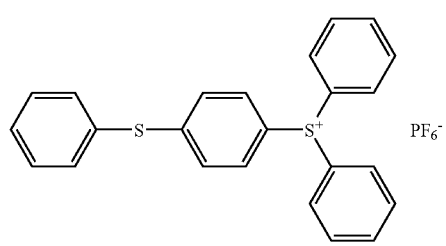 PF₆⁻
(b-25)
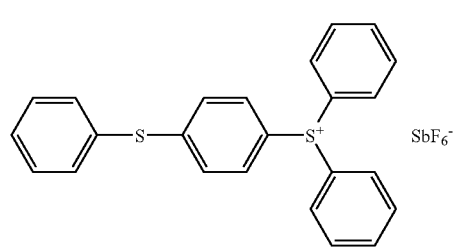 SbF₆⁻
(b-26)
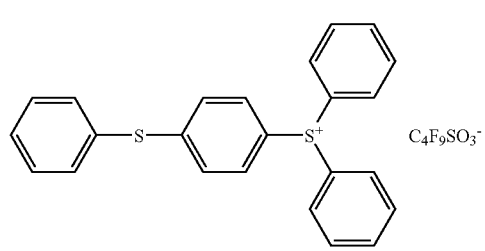 C₄F₉SO₃⁻
(b-27)
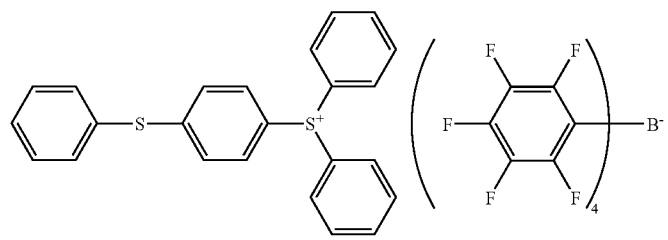
(b-28)
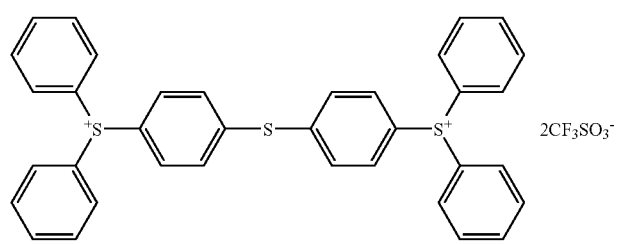 2CF₃SO₃⁻

-continued
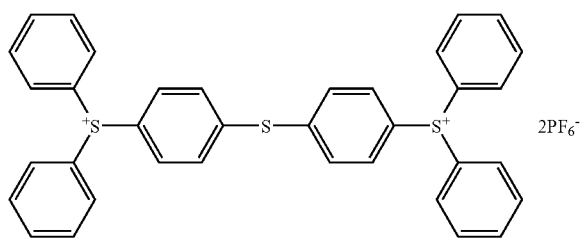 (b-29)
2PF$_6^-$
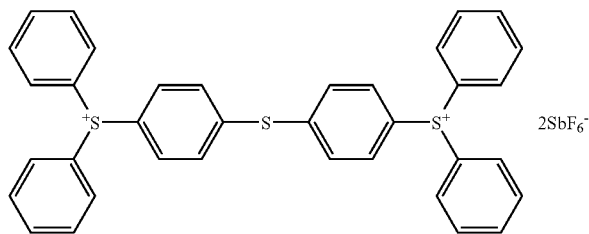 (b-30)
2SbF$_6^-$
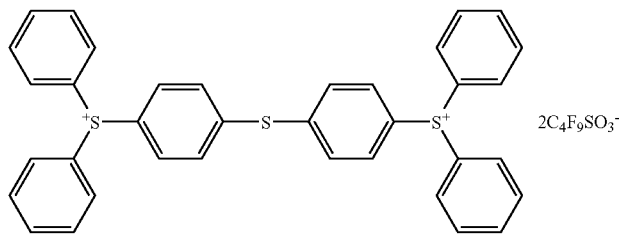 (b-31)
2C$_4$F$_9$SO$_3^-$
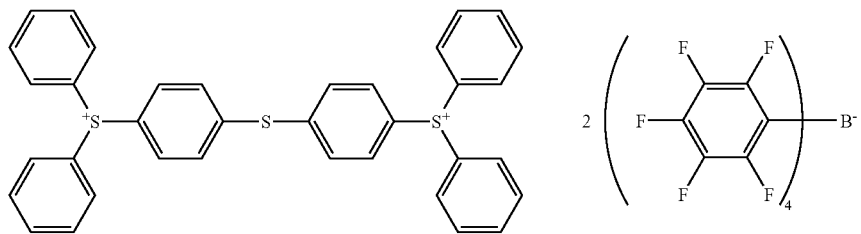 (b-32)
(b-33)
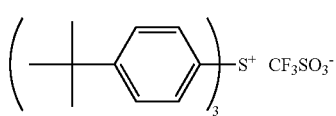
(b-34)
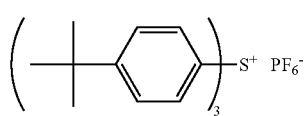
(b-35)
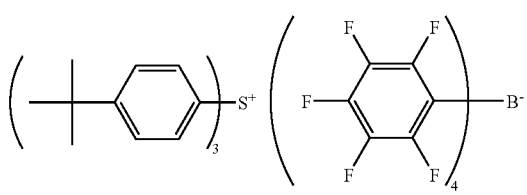
(b-36)
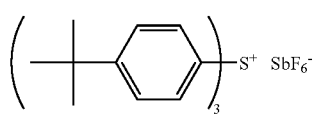
(b-37)
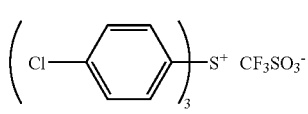
(b-38)
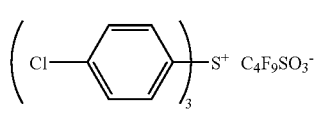
(b-39)
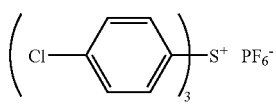
(b-40)
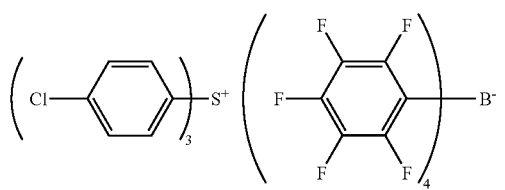

-continued
| | |
|---|---|
| (b-41) 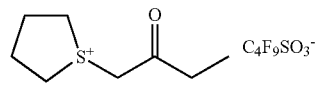 | (b-42) 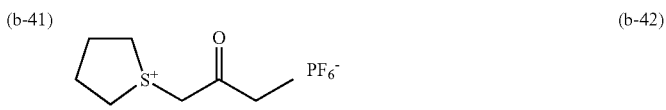 |
| (b-43) 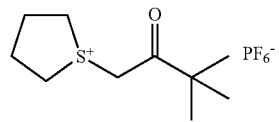 | (b-44) 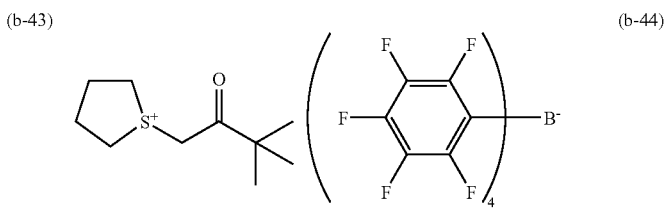 |
| (b-45) 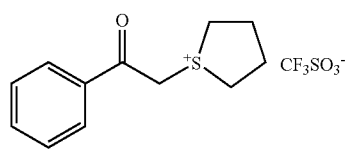 | (b-46) 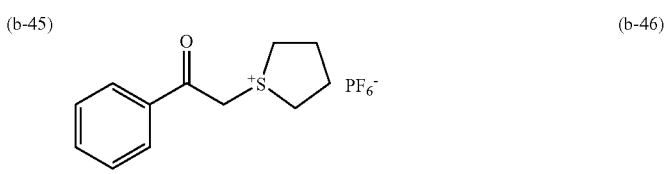 |
| (b-47) 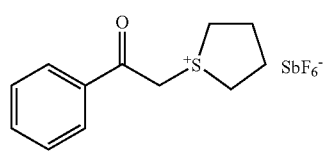 | (b-48) 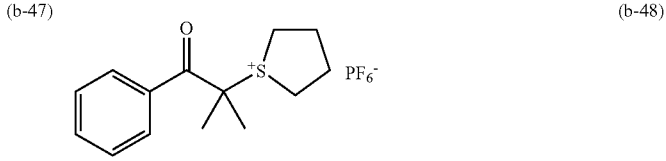 |
| (b-49) 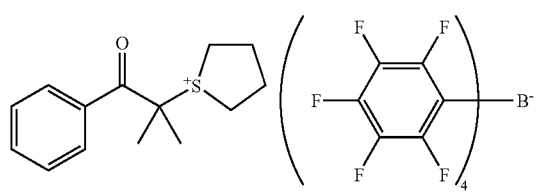 | (b-50) 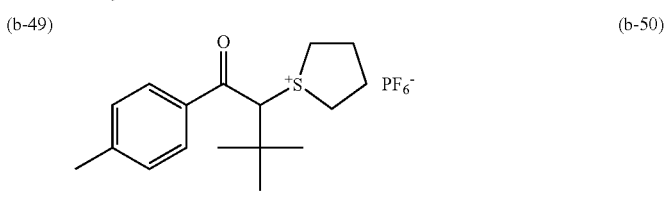 |
| (b-51) 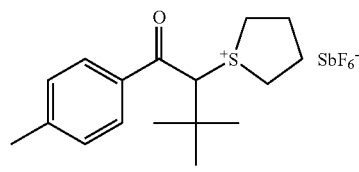 | (b-52) 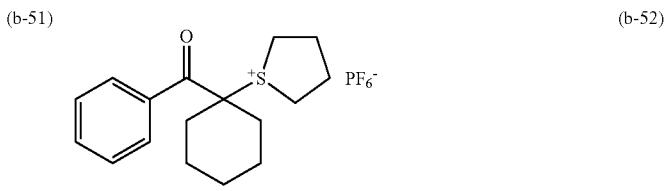 |
| (b-53) 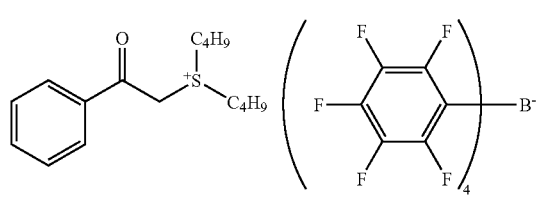 | (b-54) 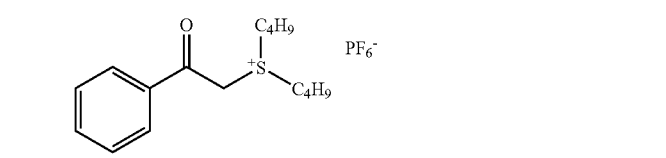 |
| (b-55) 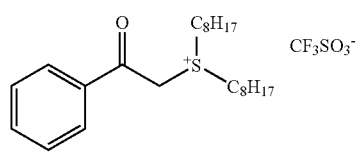 | (b-56) 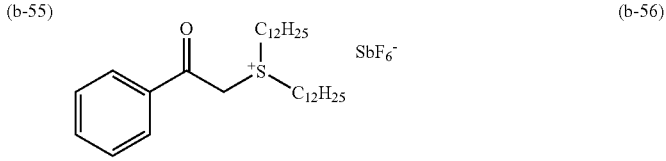 |
| (b-57) 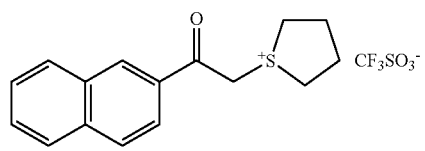 | (b-58) 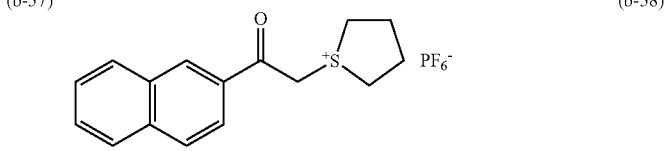 |

-continued
(b-59) 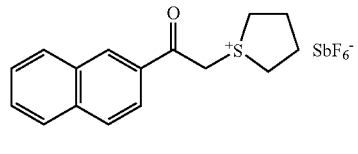
(b-60) 
(b-61) 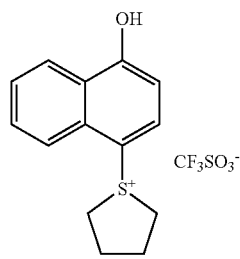
(b-62) 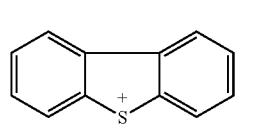
(b-63) 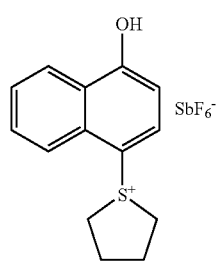
(b-64) 
(b-65) 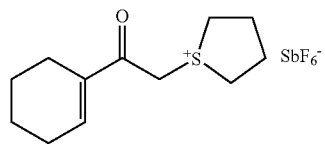
(b-66) 
(b-67) 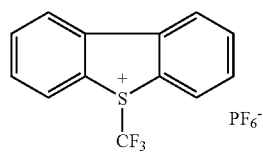
(b-68) 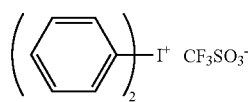
(b-69) 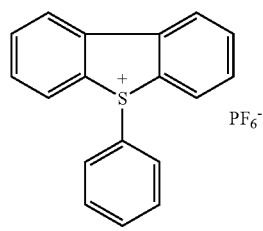
(b-70) 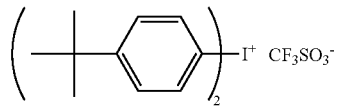
(b-71) 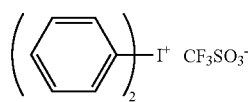
(b-72) 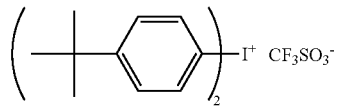
(b-73) 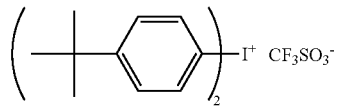
(b-74) 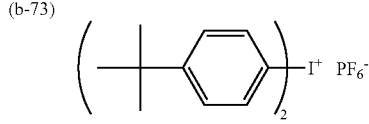

-continued
(b-75)
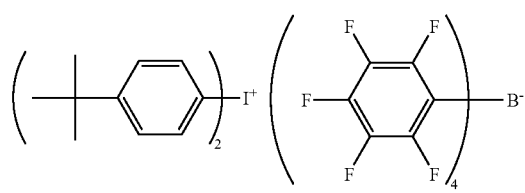
(b-76)
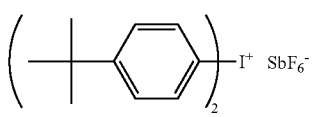
(b-77)
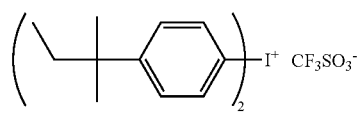
(b-78)
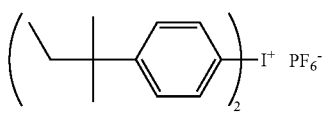
(b-79)
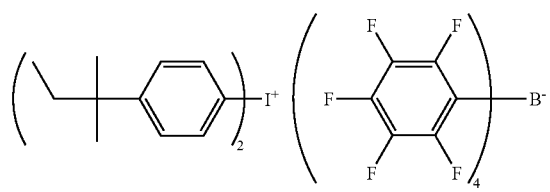
(b-80)
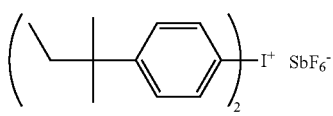
(b-81)
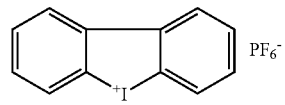
(b-82)
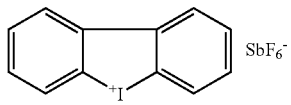
(b-83)
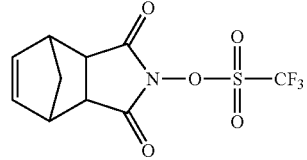
(b-84)
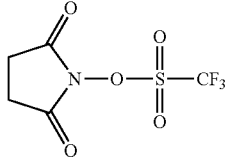
(b-85)
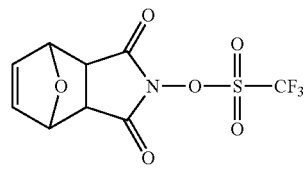
(b-86)
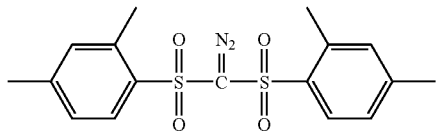
(b-87)
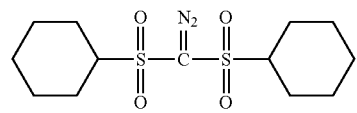
(b-88)
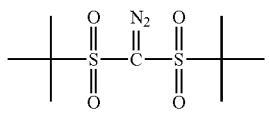
(b-89)
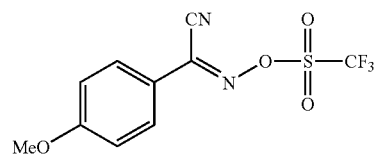
(b-90)
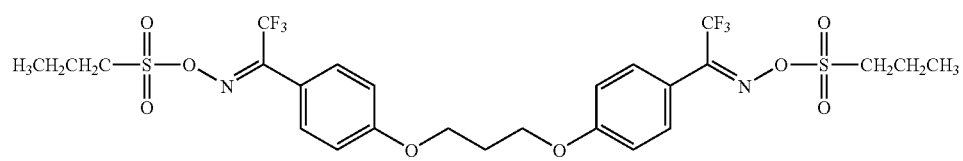
(b-91)
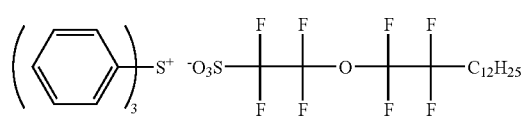

-continued

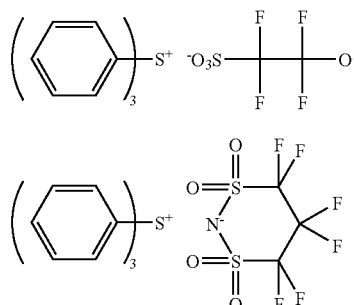
(b-92)

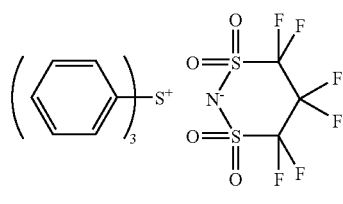
(b-93)

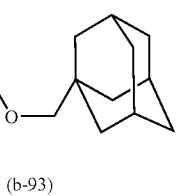
(b-94)

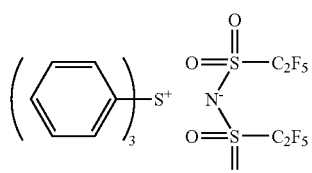

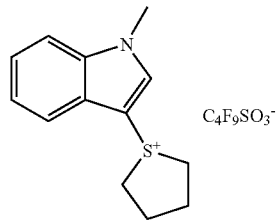
(b-95)

(b-96)

In addition, the oxazole compounds and the s-triazine compounds described in paragraphs [0029] and [0030] of JP-A No. 2002-122994 can be also preferably used as the photo-acid generating agent in the invention. Furthermore, the onium salt compounds and the sulfonate compounds illustrated in paragraphs [0037] to [0063] of JP-A No. 2002-122994 can be also preferably used as the photo-acid generating agent in the invention.

The (b) photo-acid generating agent may be used singly or in a combination of two or more thereof in the invention.

The amount of the (b) photo-acid generating agent in the composition of the invention is preferably from 0.1 to 20% by mass, more preferably from 0.5 to 10% by mass, and is further preferably from 1 to 7% by mass, based on the total solid content of the composition.

(c) Cationic Polymerizable Monomer

There is no particular restriction to the (c) cationic polymerizable monomer used in the invention as long as it is a compound capable of causing polymerization reaction by an acid generated from the (b) photo-acid generating agent and being cured, and any of various cationic polymerizable monomers hitherto known as cationic photopolymerizable monomers can be used. Examples of a cationic polymerizable monomer usable as the (c) cationic polymerizable monomer include the epoxy compounds, the vinyl ether compounds and the oxetane compounds described in JP-A Nos. 6-9714, 2001-31892, 2001-40068, 2001-55507, 2001-310938, 2001-310937 or 2001-220526.

Examples of the epoxy compounds include an aromatic epoxide, an alicyclic epoxide and an aliphatic epoxide.

Examples of the aromatic epoxide include a di- or polyglycidyl ether produced by reaction of a polyphenol having at least one aromatic nucleus or alkylene oxide adducts thereof with epichlorohydrin, and examples thereof include a di- or polyglycidyl ether of bisphenol A or an alkylene oxide adduct thereof, a di- or polyglycidyl ether of hydrogenated bisphenol A or an alkylene oxide adduct thereof, and novolac epoxy resins. Herein, examples of the alkylene oxide include ethylene oxide, propylene oxide and the like.

Preferable examples of the alicyclic epoxide include cyclohexene oxide- or cyclopentene oxide-containing organic compounds, which are produced by epoxidizing compounds having at least one of cycloalkene, such as cyclohexene or cyclopentene, by using an appropriate oxidizing agent such as hydrogen peroxide or a peracid.

Examples of the aliphatic epoxide include di- or polyglycidyl ethers of aliphatic polyhydric alcohol compounds or alkylene oxide adducts thereof. Representative examples of these ethers include an alkylene glycol diglycidyl ether such as ethylene glycol diglycidyl ether, propylene glycol diglycidyl ether or 1,6-hexanediol diglycidyl ether, polyglycidyl ether of polyhydric alcohol such as di- or triglycidyl ether of glycerin or an alkylene oxide adduct thereof, and a polyalkylene glycol diglycidyl ether typified by diglycidyl ether of polyethylene glycol or an alkylene oxide adduct thereof, or diglycidyl ether of polypropylene glycol or an alkylene oxide adduct thereof. Herein, examples of the alkylene oxide include ethylene oxide, propylene oxide and the like.

The epoxy compounds may be either monofunctional or multifunctional.

Examples of the monofunctional epoxy compound usable in the invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monooxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Examples of the multifunctional epoxy compound usable in the invention include diglycidyl ether of bisphenol A, diglycidyl ether of bisphenol F, diglycidyl ether of bisphenol S, diglycidyl ether of brominated bisphenol A, diglycidyl ether of brominated bisphenol F, diglycidyl ether of brominated bisphenol S, epoxy novolc resin, hydrogenated diglycidyl ether of bisphenol A, hydrogenated diglycidyl ether of bisphenol F, hydrogenated diglycidyl ether of bisphenol S, 3,4-epoxycyclohexylmethyl-3',4'-epoxycyclohexane carboxylate, 2-(3,4-epoxycyclohexyl-5,5-spiro-3,4-epoxy)cyclohexane-meta-dioxane, bis(3,4-epoxycyclohexylmethyl)

adipate, vinylcyclohexene oxides, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylenebis(3,4-epoxycyclohexane), dicyclopentanediene diepoxide, ethylene glycol di(3,4-epoxycyclohexylmethyl)ether, ethylenebis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ether, 1,1,3-tetradecadiene dioxide, limonene dioxide, 1,2,7,8-diepoxyoctane and 1,2,5,6-diepoxycyclooctane.

Among these epoxy compounds, from the viewpoint of superiority in curing speed, aromatic epoxies and alicyclic epoxies are preferable, and alicyclic epoxies are particularly preferable.

Examples of the vinyl ether compounds include di- or trivinyl ether compounds including ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether and trimethylolpropane trivinyl ether, or monovinyl ether compounds including ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyk ether, n-propyl vinyl ether, isopropyl vinyl ether, isopropylether-O-propylene carbonate, dodecyl vinyl ether, diethylene glycol monovinyl ether and octadecyl vinyl ether.

The vinyl ether compound may be either monofunctional or multifunctional.

Examples of the monofunctional vinyl ether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether and phenoxypolyethylene glycol vinyl ether.

Examples of the multifunctional vinyl ether include a divinyl ether, such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether or bisphenol F alkylene oxide divinyl ether; and a multifuctional vinyl ether, such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerithritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether or propylene oxide-added dipentaerythritol hexavinyl ether.

Among these vinyl ether compounds, from the viewpoints of curability, adhesion to recording materials and surface hardness of images formed, the di- or trivinyl ether compounds are preferable, and the divinyl ether compounds are particularly preferable.

The "oxetane compound" which can be used in the invention refers to a compound having an oxetane ring, and examples of the oxetane compound include those arbitrarily selected from known oxetane compounds such as those described in JP-A Nos. 2001-220526, 2001-310937 and 2003-341217.

A compound having 1 to 4 oxetane rings in their respective structures can be preferably used as the oxetane ring-containing compound in the radiation-curable polymerizable composition of the invention. Utilization of such compounds enables easily keeping a viscosity of the composition being within the range to ensure good handling and achieving high adhesion between the composition after curing and a recording material.

Examples of an oxetane compound having one or two oxetane rings in a molecule include compounds represented by any one of the following Formulae (1) to (3).

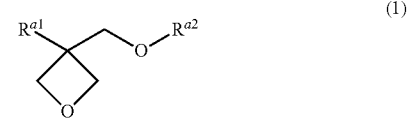

(1)

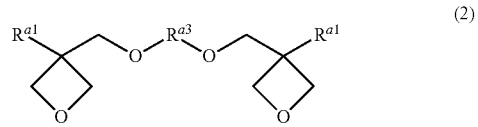

(2)

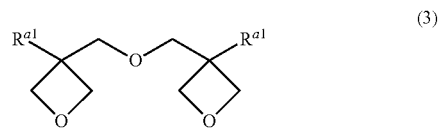

(3)

In Formulae (1) to (3), $R^{a1}$ represents a hydrogen atom, an alkyl group having 1 to 6 carbon atoms, a fluoroalkyl group having 1 to 6 carbon atoms, an allyl group, an aryl group, a furyl group or a thienyl group. When two $R^{a1}$s are present in a molecule, they may be the same or different. Examples of the alkyl group include a methyl group, an ethyl group, a propyl group and a butyl group. Examples of the fluoroalkyl group include a methyl group, an ethyl group, a propyl group and a butyl group, at least one hydrogen atom of each of which is substituted with a fluorine atoms.

In Formula (1), $R^{a2}$ represents a hydrogen atom, an alkyl group having 1 to 6 carbon atoms, an alkenyl group having 2 to 6 carbon atoms, a group having an aromatic ring, an alkylcarbonyl group having 2 to 6 carbon atoms, an alkoxycarbonyl group having 2 to 6 carbon atoms, or an N-alkylcarbamoyl group having 2 to 6 carbon atoms. Examples of the alkyl group include a methyl group, an ethyl group, a propyl group and a butyl group. Examples of the alkenyl group include a 1-propenyl group, a 2-propenyl group, a 2-methyl-1-propenyl group, a 2-methyl-2-propenyl group, a 1-butenyl group, a 2-butenyl group and a 3-butenyl group. Examples of the group having an aromatic ring include a phenyl group, a benzyl group, a fluorobenzyl group, a methoxybenzyl group and a phenoxyethyl group. Examples of the alkylcarbonyl group include an ethylcarbonyl group, a propylcarbonyl group and a butylcarbonyl group. Examples of the alkoxycarbonyl group include an ethoxycarbonyl group, a propoxycarbonyl group and a butoxycarbonyl group.

Examples of the N-alkylcarbamoyl group include an ethylcarbamoyl group, a propylcarbamoyl group, a butylcarbamoyl group and a pentylcarbamoyl group.

In Formula (2), $R^{a3}$ represents a linear or branched alkylene group, a linear or branched poly(alkyleneoxy) group, a linear or branched unsaturated hydrocarbon group, a carbonyl group or a carbonyl group-containing alkylene group, a carboxyl group-containing alkylene group, a carbamoyl group-containing alkylene group, or any of groups illustrated below. Examples of the alkylene group include an ethylene group, a propylene group and a butylene group. Examples of the poly (alkyleneoxy) group include a poly(ethyleneoxy) group and a poly(propyleneoxy) group. Examples of the unsaturated hydrocarbon group include a propenylene group, a methylpropenylene group and a butenylene group.

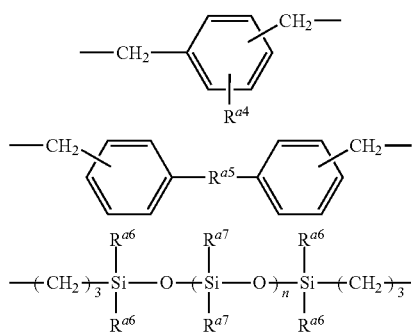

In the polyvalent group, $R^{a4}$ represents a hydrogen atom, an alkyl group having 1 to 4 carbon atoms, an alkoxy group having 1 to 4 carbon atoms, a halogen atom, a nitro group, a cyano group, a mercapto group, a lower alkylcarboxyl group, a carboxyl group or a carbamoyl group.

$R^{a5}$ represents an oxygen atom, a sulfur atom, a methylene group, —NH—, —SO—, —SO$_2$—, —C(CF$_3$)$_2$—, or —C(CH$_2$)$_2$—.

$R^{a6}$ represents an alkyl group having 1 to 4 carbon atoms or an aryl group, and n represents an integer from 0 to 2,000.

$R^{a7}$ represents an alkyl group having 1 to 4 carbon atoms, an aryl group, or a monovalent group having the following structure.

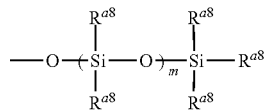

In the monovalent group, $R^{a8}$ represents an alkyl group having 1 to 4 carbon atoms, or an aryl group, and m represents an integer from 0 to 100.

Examples of an oxetane compound having 3 or 4 oxetane rings include compounds represented by the following Formula (4).

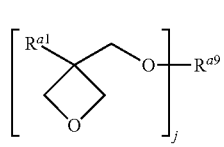

In Formula (4), $R^{a1}$ has the same meaning as the $R^{a1}$ in Formula (1), $R^{a9}$ is a polyvalent linkage group. Examples of the polyvalent linkage group represented by $R^{a9}$ include a branched alkylene group having 1 to 12 carbon atoms such as those illustrated by the any one of the following Formulae A to C, a branched poly(alkyleneoxy) group such as those illustrated by the following Formula D, and a branched polysiloxy group such as those illustrated by the following Formula E. j is 3 or 4.

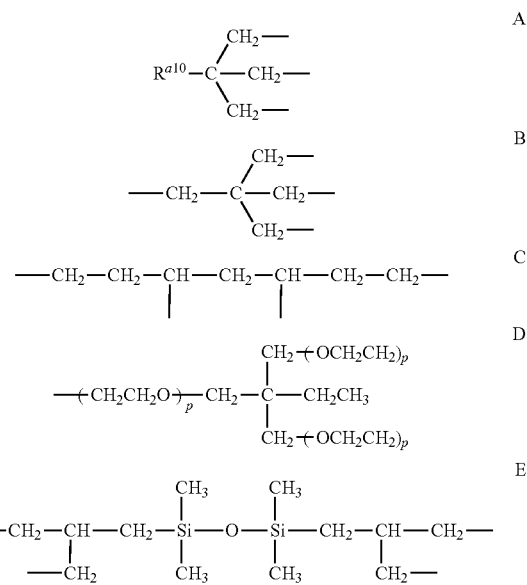

In Formula A, $R^{a10}$ represents a methyl group, an ethyl group or a propyl group. In the Formula D, p is an integer from 1 to 10.

Examples of the oxetane compound which can be preferably used in the invention further include a compound having an oxetane ring(s) as a side chain(s) thereof such as that illustrated by the following Formula (5).

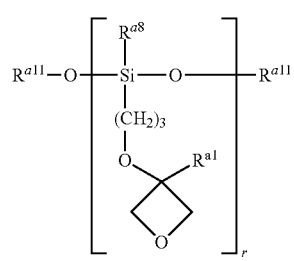

In Formula (5), $R^{a8}$ has the same meaning as the $R^{a8}$ in Formula (4), $R^{a11}$ represents an alkyl group having 1 to 4 carbon atoms, such as a methyl group, an ethyl group, a propyl group or a butyl group, or a trialkylsilyl group, and r is an integer from 1 to 4.

The oxetane ring-containing compounds as recited above are mentioned in detail in paragraphs [0021] to [0084] of JP-A No. 2003-341217, and the compounds mentioned therein can be preferably used in the invention.

Among these oxetane compounds, the compound having one oxetane ring can be more preferably used from the viewpoints of viscosity and tackiness of the composition.

While the cationic polymerizable monomers may be used singly or in a combination of any two or more thereof in the radiation-curable polymerizable composition of the invention, from the viewpoint of effectively inhibiting shrinkage at ink curing time, it is preferable to use a vinyl ether compound and at least one compound selected from oxetane compounds or epoxy compounds in combination.

The amount of the (c) cationic polymerizable monomer in the composition of the invention is appropriately from 10 to 95% by mass, preferably from 30 to 90% by mass, and is more preferably from 50 to 85% by mass, based on the amount of the total solids in the composition.

In the radiation-curable polymerizable composition of the invention, various additives can be arbitrary used in addition to the essential components according to desired purposes. Such arbitrary components are described below.

Organic Acidic Component

An organic acidic component having a pKa value of 2 to 6 can be added to the radiation-curable polymerizable component of the invention. A qualitatively weakly-acidic organic compound corresponds to the organic acidic component having a pKa value of 2 to 6 which can be used in the invention. When the pKa of an organic acidic component is greater than 6, addition of this component to the radiation-curable polymerizable composition of the invention may cause a reduction in sensitivity; while, when the pKa is smaller than 2, temporal stability of the composition may be degraded. Therefore, it is preferable in the invention to use a compound showing a pKa value of 2 to 6 as the organic acidic component.

Examples of the organic acidic component having a pKa value of 2 to 6 include a phosphoric acid monoester, a phosphoric acid diester, a phosphonic acid, a phosphinic acid and a carboxylic acid. Among these acids, carboxylic acid in particular can be preferably used. Examples of the carboxylic acid include a monocarboxylic acid, a dicarboxylic acid and a tricarboxylic acid, which are aliphatic or aromatic and each of which has 1 to 20 carbon atoms, and specific examples thereof include acetic acid, phenylacetic acid, phenoxyacetic acid, methoxypropionic acid, lactic acid, hexanoic acid, heptanoic acid, octanoic acid, palmitic acid, stearic acid, oleic acid, linolenic acid, cyclopropylcarboxylic acid, cyclobutanecarboxylic acid, cyclopentanecarboxylic acid, cyclohexanecarboxylic acid, 1-adamantanecarboxylic acid, 1,3-adamantanedicarboxylic acid, norbornene-2,3-dicarboxylic acid, abietic acid, trans-retinoic acid, cyclohexylacetic acid, dicyclohexylacetic acid, adamantaneacetic acid, malonic acid, malonic acid monomethyl ester, fumaric acid, maleic acid, maleic acid monoethyl ester, itaconic acid, crotonic acid, succinic acid, adipic acid, sebacic acid, glycolic acid, diglycolic acid, mandelic acid, tartaric acid, malic acid, alginic acid, cinnamic acid, methoxycinnamic acid, 3,5-dimethoxycinnamic acid, benzoic acid, salicylic acid, 4-hydroxybenzoic acid, gallic acid, 3-nitrobenzoic acid, 3-chlorobenzoic acid, 4-vinylbenzoic acid, t-butylbenzoic acid, 1-naphthoic acid, 1-hydroxy-2-naphthoic acid, fluorenone-2-carboxylic acid, 9-anthracenecarboxylic acid, 2-anthraquinonecarboxylic acid, phthalic acid, phthalic acid monomethyl ester, isophthalic acid, terephthalic acid, trimellitic acid and trimellitic acid monomethyl ester. It is noted that these examples should not be construed as limiting the scope of the invention.

Coloring Agent

Visible images can be formed by using the radiation-curable polymerizable composition of the invention when a coloring agent is added to the composition. Although addition of a coloring agent to the composition is not necessarily required, it is advantageous in cases such as that when an image area is formed therewith on a planographic printing plate from the viewpoint of easiness in the planographic printing plate made.

There is no particular restriction to the coloring agents usable in the invention, and various known coloring agents (pigments and dyes) can be appropriately selected and used according to the intended uses. For instance, in the case of forming images excellent in weather resistance, pigments are preferably used. While either water-soluble dyes or oil-soluble dyes can be used, oil-soluble dyes are preferably used in the composition of the invention.

Pigment

There is no particular limitation to the pigment which can be used in the invention, and examples thereof include all of commercially available organic pigments and inorganic pigments, which may be dispersed in a dispersion media such as an insoluble resin. The surface of the pigment may be grafted with a resin. The pigment may be a resin particle colored with dyes.

Examples of the pigment include those described, e.g., in Seishiro Itoh, Ganryo no Jiten (published in 2000), W. Herbst & K. Hunger, Industrial Organic Pigments, JP-A No. 2002-12607, 2002-188025, 2003-26978 or 2003-342503.

The organic or inorganic pigment usable in the invention may exhibit any color such as yellow, red, magenta, blue, cyan, green, orange, black, white or the like according to necessity.

Specific examples of yellow pigment include: monoazo pigments such as C.I. Pigment Yellow 1 (e.g., Fast Yellow G) or C.I. Pigment Yellow 74; dis-azo pigments, such as C.I. Pigment Yellow 12 (e.g., Dis-azo Yellow AAA) or C.I. Pigment Yellow 17; non-benzidine azo pigments such as C.I. Pigment Yellow 180; azo lake pigments such as C.I. Pigment Yellow 100 (e.g., Tartrazine Yellow lake); condensed azo pigments such as C.I. Pigment Yellow 95 (e.g., condensed Azo Yellow GR); acidic dye lake pigments such as C.I. Pigment Yellow 115 (e.g., Quinoline Yellow lake); basic dye lake pigments such as C.I. Pigment Yellow 18 (e.g., Thioflavin lake); anthraquinone pigments such as Flavanthrone Yellow (Y-24); isoindolenone pigments such as Isoindolinone Yellow 3RLT (Y-110); quinophthalone pigments such as Quinophthalone Yellow (Y-138); isoindoline pigments such as Isoindoline Yellow (Y-139); nitroso pigments such as C.I. Pigment Yellow 153 (e.g., Nickel Nitroso Yellow); and metal-complex azomethine pigments such as C.I. Pigment Yellow 117 (e.g., Cupper-azomethine Yellow).

Examples of red or magenta pigment include: monoazo pigments such as C.I. Pigment Red 3 (e.g., Toluidine Red); dis-azo pigments such as C.I. Pigment Red 38 (e.g., Pyrazolone Red B); azo lake pigments such as C.I. Pigment Red 53:1 (e.g., Lake Red C) or C.I. Pigment Red 57:1 (e.g., Brilliant Carmine 6B); condensed azo pigments such as C.I. Pigment Red 144 (e.g., condensed Azo Red BR); acidic dye lake pigments such as C.I. Pigment Red 174 (e.g., Phloxine B Lake); basic dye lake pigments such as C.I. Pigment Red 81 (e.g., Rhodamine 6G' Lake); anthraquinone pigments such as C.I. Pigment Red 177 (e.g., Dianthraquinonyl Red); thioindigo pigments such as C.I. Pigment Red 88 (e.g., Thioindigo Bordeaux); perynone pigments such as C.I. Pigment Red 194

(e.g., Perynone Red); perylene pigments such as C.I. Pigment Red 149 (e.g., Perylene Scarlet); quinacridone pigments such as C.I. Pigment Violet 119 (unsubstituted quinacridone) or C.I. Pigment Red 122 (e.g., Quinacridone Magenta); isoindolinone pigments such as C.I. Pigment Red 180 (e.g., Isoinsolinone Red 2BLT); and alizarin lake pigments such as C.I. Pigment Red 83 (e.g., Madder Lake).

Examples of blue or cyan pigment include: dis-azo pigments such as C.I. Pigment Blue 25 (e.g., Dianisidine Blue); phthalocyanine pigments such as C.I. Pigment Blue 15 (e.g., Phthalocyanine Blue); acidic dye lake pigments such as C.I. Pigment Blue 24 (e.g., Peacock Blue Lake); basic dye lake pigments such as C.I. Pigment Blue 1 (e.g., Bichlothia Pure Blue BO Lake); anthraquinone pigments such as C.I. Pigment Blue 60 (e.g., Indanthrone Blue); and alkali blue pigments such as C.I. Pigment Blue 18 (e.g., Alkali Blue V-5:1).

Examples of green pigment include phthalocyanine pigments such as C.I. Pigment Green 7 (Phthalocyanine Green) or C.I. Pigment Green 36 (Phthalocyanine Green); and azo-metal complex pigments such as C.I. Pigment Green 8 (Nitroso Green).

Examples of orange pigment include: isoindoline pigments such as C.I. Pigment Orange 66 (Isoindoline Orange); and anthraquinone pigments such as C.I. Pigment Orange 51 (Dichloropyranthrone Orange).

Examples of black pigment include carbon black, titan black and aniline black.

Examples of white pigment usable in the invention include basic carbonate white lead ($2PbCO_3Pb(OH)_2$ known as silver white), zinc oxide (ZnO known as zinc white), titanium oxide ($TiO_2$ known as titanium white), strontium titanate ($SrTiO_3$ known as titanium strontium white).

Since titanium oxide has a lower specific gravity, a higher refractive index, and a higher physical stability as compared with other white pigments, titanium oxide can provide a greater masking ability and coloring ability as pigment, and higher durability against acid, alkali and other adverse environments. Accordingly, titanium oxide can be preferably used as white pigment in the invention. Other white pigments (including those which are not recited above) may also be used as required.

Dispersing of the pigment can be performed by using a dispersing apparatus such as a ball mill, a sand mill, an attrition mill, a roll mill, a jet mill, a homogenizer, a paint shaker, a kneader, an agitator, a Henschel mixer, a colloid mill, a ultrasonic homogenizer, a pearl mill, a wet jet mill or the like.

A dispersing agent can be add to the pigment when dispersing the pigment. Examples of the dispersing agent include hydroxyl group-containing carboxylic acid esters, salts of long-chain polyaminoamide high-molecular-weight acid esters, high-molecular-weight polycarboxylic acid salts, high-molecular-weight unsaturated acid esters, high-molecular copolymers, modified polyacrylates, aliphatic polycarboxylic acids, naphthalenesulfonic acid-formaldehyde condensates, polyoxethylene alkylphosphoric acid esters, and pigment compounds. In addition, commercially available polymeric dispersing agents, such as SOLSPERSE® Series (manufactured by Zeneca), can also be preferable used.

Furthermore, it is also possible to use, as a dispersing aid, a synergist which is appropriate to the pigment to be used. The dispersing agent and the dispersing aid are preferably added in an amount of 1 to 50 parts by mass relative to 100 parts by mass of the pigment.

In the radiation-curable polymerizable composition, a solvent may be additionally used as a dispersing medium for various ingredients including pigment. Alternatively, the (c) cationic polymerizable monomer, which is a low-molecular-weight ingredient, may be utilized as a dispersing medium without using any solvent. Since the ink composition provided by the invention is a radiation curable ink which is cured after application to a recording material. In a case where a solvent remains in a cured image, the cured image may cause problem such as deterioration in resistance against solvents or a residual volatile organic compound (VOC). In consideration of these, the ink composition of the invention is preferably solvent-free. It is preferable to use the (c) cationic polymerizable monomer as the dispersing medium, and it is specifically preferable to select a cationic polymerizable monomer having lowest viscosity, from the viewpoints of suitability to dispersing and improvement in handling of the ink composition.

The average particle size of the pigment is preferably in a range of 0.02 to 0.4 µm, is more preferably in a range of 0.02 to 0.1 µm, and is further preferably in a range of 0.02 to 0.7 µm.

The selections of the pigment, a dispersing agent and a dispersing medium and the settings of conditions for dispersing and filtrating can be made so that the average pigment particle size falls within the range specified above. When the particle size is controlled as above, clogging of head nozzles can be prevented, and storage stability, transparency and curing sensitivity of the ink composition can be maintained.

Dye

A dye which can be used in the invention is preferably an oil-soluble dye. The "oil-soluble dye" specifically refers to a dye having the water solubility (an amount by mass of the dye dissolved in 100 g of water) of 1 g or less at 25° C. The water solubility of the dye which can be used in the invention at 25° C. is preferably 0.5 g or less, and is more preferably 0.1 g or less. Accordingly, dyes which are known as water-insoluble, oil-soluble dyes can be preferably used in the invention.

An oil-solubilizing group, which is capable of imparting, to the dye, a solubility to oil, may be preferably introduced into mother nuclei of the dye used in the invention for the purpose of dissolving a required amount of the dye into the radiation-curable polymerizable composition.

Examples of the oil-solubilizing group include long-chain and branched alkyl groups, long-chain and branched alkoxy groups, long-chain and branched alkylthio groups, long-chain and branched alkylsulfonyl groups, long-chain and branched acyloxy groups, long-chain and branched alkoxycarbonyl groups, long-chain and branched acyl groups, long-chain and branched acylamino groups, long-chain and branched alkylsulfonylamino groups, long-chain and branched alkylaminosulfonyl groups, and aryl, aryloxy, aryloxycarbonyl, arylcarbonyloxy, arylaminocarbonyl, arylaminosulfonyl and arylsulfonylamino groups each having as substituent(s) any of the long-chain and branched groups recited above.

The dye used in the invention may be obtained from water-soluble dyes having carboxylic or sulfonic acid groups by convering an acid group(s) thereof into an oil-solubilizing groups such as an alkoxycarbonyl group, an aryloxycarbonyl group, an alkylaminosulfonyl group or arylaminosulfonyl group by using long-chain or branched alcohol, amine, phenol or an aniline compound.

A melting point of the oil-soluble dye is preferably 200° C. or less, more preferably 150° C. or less, and further preferably 100° C. or less. By using an oil-soluble dye having a low melting point, precipitation of a crystallized colorant in the radiation-curable polymerizable composition can be suppressed and improvement in storage stability of the radiation-curable polymerizable composition can be achieved.

In addition, it is preferable that the oxidation potential of the oil-soluble dye used in the invention is noble (high) for the purpose of improving resistance to discoloration, and particularly for the purpose of improving resistance to an oxidizing substance like ozone, and improving curing properties. Therefore, the oxidation potential of the oil-soluble dye used in the invention is preferably 1.0 V (with respect to SCE) or more. The higher oxidation potential is the more preferable the oxidation potential of the oil-soluble dye used in the invention is more preferably 1.1 V (with respect to SCE) or more, are is further preferably 1.15 V (with respect to SCE) or more.

Preferable examples of the yellow dye include compounds represented by the formula (Y-I) described in JP-A No. 2004-250483.

Particularly preferable examples of the dye include those represented by any one of the formulae (Y-II) to (Y-IV) described in the paragraph [0034] of JP-A No. 2004-250483, and specific examples thereof include the compounds shown in paragraphs [0060] to [0071] of JP-A No. 2004-250483. The oil-soluble dyes of the formula (Y-I) described in JP-A No. 2004-250483 may be used not only in an yellow ink but also in inks of any color including a black ink, a red ink and so on.

Preferable examples of the magenta dye include compounds represented by any one of the formulae (3) and (4) described in JP-A No. 2002-114930, and specific examples thereof include the compounds shown in the paragraphs [0054] to [0073] of JP-A No. 2002-114930.

Particularly preferable examples of the magenta dye include those represented by any one of the formulae (M-1) and (M-2) described in the paragraphs [0084] to [0122] of JP-A No. 2002-121414, and specific examples thereof include the compounds shown in the paragraphs [0123] to [0132] of JP-A No. 2002-121414. The oil-soluble dyes of formulae (3), (4), and (M-1) to (M-2) described in JP-A No. 2002-121414 may be used not only in a magenta ink but also in inks of any color including a black ink, a red ink and so on.

Preferable examples of the cyan dye include those represented by any one of the formulae (I) to (IV) described in JP-A No. 2001-181547 those represented by any one of the formulae (IV-1) to (IV-4) described in the paragraphs [0063] to [0078] of JP-A No. 2002-121414, and specific examples thereof include the compounds shown in the paragraphs [0052] to [0066] of JP-A No. 2001-181547 and the paragraphs [0079] to [0081] of JP-A No. 2002-121414.

Particularly preferable examples of the cyan dye include the phthalocyanine dyes represented by any one of the formulae (C-I) and (C-II) described in the paragraphs [0133] to [0196] of JP-A No. 2002-121414s, and among these, the phthalocyanine dyes represented by the formula (C-II) are further preferable. Specific examples of these dyes include the compounds shown in the paragraphs [0198] to [0201] of JP-A No. 2002-121414. The oil-soluble dyes of any one of the formulae (I) to (IV), (IV-1) to (IV-4) and (C-I) to (C-II) may be used not only in a cyan ink but also in inks of any color including a black ink, a green ink and so on.

Oxidation Potential

The oxidation potential value (Eox) of the dye used in the invention can be easily determined by persons skilled in the art. The determination method thereof is described in documents such as: P. Delahay, "New Instrumental Methods in Electrochemistry", Interscience Publisher (1954); A. J. Bard et al., "Electrochemical Methods", John wiley & Sons (1980); and Akira Fujishima et al., "Denki Kagaku Sokuteiho (Measuring methods for electrochemistry)", Gihodo Shuppan Co., Ltd. (1984).

More specifically, the oxidation potential is determined by: dissolving a test sample into a solvent, such as dimethylformamide or acetonitrile containing a supporting electrolyte such as sodium perchlorate or tetrapropylammonium perchlorate, so that a concentration the test sample becomes $1 \times 10^{-2}$ to $1 \times 10^{-6}$ mole/liter; putting the obtained solution in a cyclic voltammetry apparatus or a direct-current polarography apparatus having carbon (glassy carbon: GC) as a working electrode and a rotating platinum electrode as a counter electrode; carrying out sweeping toward the oxidation side (noble side) so as to observe an oxidation wave generated thereby; approximating the thus obtained oxidation wave by a straight line; and determining, as a value versus SCE (saturated calomel electrode), an midpoint potential value on a line segment formed between an intersection point of the straight line and a remaining current-potential line and an intersection point of the straight line and a saturated current line (or an intersection point of the straight line and a line parallel to the vertical axis passing through the peak potential value). Although this value may have a deviation of the order of several tens of millivolts under the influences of a liquid junction potential, solution resistance of a sample solution and so on, it is possible to ensure reproducibility of the potential by using a standard sample (e.g., hydroquinone). In addition, a supporting electrolyte and a solvent for use therein can be appropriately chosen according to oxidation potential and solubility of a test sample. Explanations regarding usable supporting electrolytes and solvents can be found in Akira Fujishima et al., "Denki Kagaku Sokuteiho (Measuring methods for electrochemistry)", Gihodo Shuppan Co., Ltd. (1984).

The amount of a coloring agent added to the radiation-curable polymerizable composition is preferably from 1 to 20% by mass, and is more preferably from 2 to 10% by mass relative to a total amount of the composition in terms of a solid content.

Ultraviolet Absorbing Agent

In the invention, an ultraviolet absorbing agent can be used from the viewpoints of improvement in weather resistance of images formed and prevention of discoloration.

Examples of the ultraviolet absorbing agent include the benzotriazole compounds described in JP-A Nos. 58-185677, 61-190537, 2-782, 5-197075 or 9-34057, the benzophenone compounds described in JP-A Nos. 46-2784 or 5-194483 and U.S. Pat. No. 3,214,463, the cinnamic acid compounds described in JP-B Nos. 48-30492, 56-21141 or JP-A No. 10-88106, the triazine compounds described in JP-A Nos. 4-298503, 8-53427, 8-239368, 10-182621 or PCT National Publication No. 8-501291, the compounds described in Research Disclosure, No. 24239, and compounds emitting fluorescence upon absorption of ultraviolet rays, which are typified by stilbene compounds, benzoxazole compounds and the like and known as fluorescent whitening agents.

The amount of the ultraviolet absorbing agent to be added to the composition of the invention is generally in a range of 0.5 to 15% by mass relative to a total amount of the composition in terms of a solid content, while the amount can be appropriately selected according to the desired purpose.

Sensitizer

For the purposes of improving acid generation efficiency of the photo-acid generating agent and shifting sensitization wavelengths to the longer wavelength side, a sensitizer may be added to the radiation-curable polymerizable composition of the invention when required. Any sensitizer may be added as long as it can sensitize the photo-acid generating agent through an electron transfer mechanism or an energy transfer mechanism. Preferable examples thereof include a condensed polycyclic aromatic ring compound such as anthracene, 9,10-dialkoxyanthracene, pyrene or perylene, an aromatic ketone compound such as acetophenone, benzophenone, thioxanthone or Michler's ketone, and a heterocyclic compound such as phenothiazine or an N-aryloxazolidinone. The amount of the sensitizer to be added is generally in a range of 0.01 to 1 mole %, and is preferably in a range of 0.1 to 0.5 mole %, based on the amount of photo-acid generating agents used in the composition of the invention, while it is appropriately selected according to the desired purpose.

Antioxidant

In view of improving stability of the radiation-curable polymerizable composition, an antioxidant can be added to the composition. Examples of the antioxidant include the compounds described in EP-A-223739, EP-A-309401, EP-A-309402, EP-A-310551, EP-A-310552, EP-A-459416, DE-A-3435443, JP-A Nos. 54-48535, 62-262047, 63-113536, 63-163351, 2-262654, 2-71262, 3-121449, 5-61166, 5-119449, or U.S. Pat. Nos. 4,814,262 or 4,980,275.

The amount of the antioxidant added to the composition is generally in a range of 0.1 to 8% by mass relative to the amount of the composition in terms of a solid content, while the amount can be appropriately selected according to the desired purpose.

Discoloration Inhibitor

A discoloration inhibitor selected from various organic or metal-complex discoloration inhibitors can be used in the radiation-curable polymerizable composition of the invention. Examples of the organic discoloration inhibitor include hydroquinones, alkoxyphenols, dialkoxyphenols, phenols, anilines, amines, indanes, chromans, alkoxyanilines and heterocyclic compounds. Examples of the metal-complex discoloration inhibitor include nickel complexes and zinc complexes. Specific examples thereof include the compounds described in the patent documents cited in Research Disclosure, No. 17643, items VII-I and VII-J, ibid., No. 15162, ibid., No. 18716, p. 650, left column, ibid., No. 36544, p. 527, ibid., No. 307105, p. 872, ibid., No. 15162; and compounds included in the general formula and examples of representative compounds described in JP-A No. 62-215272, pp. 127-137.

The amount of the discoloration inhibitor added to the composition is generally in a range of 0.1 to 8% by mass relative to the amount of the composition in terms of a solid content, while the amount can be appropriately selected according to the desired purpose.

Conductive Salt

For the purpose of controlling jetting properties of the radiation-curable polymerizable composition of the invention, a conductive salt can be added to the composition. Examples of the conductive salt include potassium thiocyanate, lithium sulfate, ammonium thiocyanate and dimethylamine hydrochloride.

Solvent

For the purpose of improving adhesion of the radiation-curable polymerizable composition of the invention to a recording material, it is effective to add a trace amount of an organic solvent to the composition.

Examples of the solvent include a ketone solvent such as acetone, methyl ethyl ketone or diethyl ketone, an alcohol solvent such as methanol, ethanol, 2-propanol, 1-propanol, 1-butanol or tert-butanol, a chloride solvent such as chloroform or methylene chloride, an aromatic solvent such as benzene or toluene, an ester solvent such as ethyl acetate, butyl acetate or isopropyl acetate, an ether solvent such as diethyl ether, tetrahydrofuran or dioxane, and a glycol ether solvent such as ethylene glycol monomethyl ether or ethylene glycol dimethyl ether.

The addition of the organic solvent is effective as long as it is within the range that causes no problem such as solvent resistance or VOC, and the amount thereof is preferably from 0.1 to 5% by mass, and is more preferably from 0.1 to 3% by mass relative to the total amount of the composition.

Polymer Compound

A polymer compound selected from various kinds of polymer compounds can be added to the radiation-curable polymerizable composition of the invention for controlling film properties of the composition. Examples of the polymer compound include an acrylic polymer, polyvinyl butyral resin, polyurethane resin, polyamide resin, polyester resin, epoxy resin, phenol resin, polycarbonate resin, polyvinyl formal resin, shellac, a vinyl resin, an acrylic resin, a rubber resin, wax, and natural resins. Any two or more of these polymer compounds may be used in combination. Among these polymer compounds, vinyl copolymers obtained by copolymerization of acrylic monomers are preferable. Preferable examples of the polymer compound further include a copolymer having a carboxyl group-containing monomer, an alkyl methacrylate, or an alkyl acrylate as a structural unit thereof.

Surfactant

A surfactant may be added to the radiation-curable polymerizable composition of the invention.

Examples of the surfactant which may be added to the composition include those described in JP-A Nos. 62-173463 or 62-183457. Specific examples of the surfactant include: anionic surfactants such as dialkyl sulfosuccinates, alkyl naphthalenesulfonates, or fatty acid salts; nonionic surfactants such as polyoxyethylne alkyl ethers, polyoxyethylene alkyl aryl ethers, acetylene glycols, or polyoxyethylene/polyoxypropylene block copolymers; and cationic surfactants such as alkylamine salts or quaternary ammonium salts. An organic fluorinated compound may be used in place of the surfactant. The organic fluorinated compounds is preferably hydrophobic. Examples of the fluorinated organic compound include fluorochemical surfactants, fluorinated compounds in an oily state (e.g., fluorinated oil) and fluorinated compound resins in a solid state (e.g., tetrafluoroethylene resin), and specific examples thereof include those described in JP-B No. 57-9053 (columns 8 to 17) or JP-A No. 62-135826.

In addition to these ingredients, if needed, the radiation-curable polymerizable composition of the invention may further include other ingredients such as a leveling additive, a matting agent, a wax for controlling film properties or a tackifier for improving adhesion of the composition to a recording material such as polyolefin or PET.

The tackifier does not inhibit polymerization caused in the composition. Specific examples of the tackifier include the high-molecular-weight sticky polymers described in JP-A No. 2001-49200, pp. 5-6, such as copolymers produced from esters of (meth)acrylic acid and alcohol compounds containing alkyl groups having 1 to 20 carbon atoms, esters of (meth) acrylic acid and alicyclic alcohol compounds having 3 to 14 carbon atoms and esters of (meth)acrylic acid and aromatic alcohol compounds having 6 to 14 carbon atoms, and low-molecular-weight resins having polymerizable unsaturated bonds and imparting tackiness.

In view of jetting properties, the viscosity of the ink composition of the radiation-curable polymerizable composition of the invention is preferably in a range of 7 to 30 mPa·s, and is more preferably in a range of 7 to 20 mPa·s at the temperature when the ink is ejected. It is preferable that the proportions of ingredients of the composition are properly determined so that the viscosity of the ink composition is adjusted to be within the above-specified range. The viscosity of the ink composition at a temperature ranging from 25° C. to 30° C. is typically from 35 to 500 mPa·s, and is preferably from 35 to 200 mPa·s. Adjusting of the viscosity of the ink composition at room temperature to be a high value enables prevention of permeation of the ink into a recording material, reduction in the amount of uncured monomer molecules, reduction of odor even when the recording material is porous, and suppression of blurring of a dot formed upon impact of ink droplets ejected onto the recording material. As a result thereof, image quality can be improved. The viscosity of the ink composition lower than 35 mPa·s at temperatures of 25° to 30° C. may provide little effect on the suppression of blurring of a dot, while the viscosity of the ink composition higher than 500 mPa·s may cause a problem with delivery of ink liquid.

The surface tension of the radiation-curable polymerizable composition of the invention is preferably in a range of 20 to 30 mN/m, and is more preferably in a range of 23 to 28 mN/m. In the case when recording on various recording materials such as polyolefin film, PET film, coated paper or uncoated paper is performed by using the composition, the surface tension is preferably 20 mN/m or more from the viewpoint of ink spread and permeation, and it is preferably 30 mN/m or less from the viewpoint of wettability.

The radiation-curable polymerizable composition of the invention thus prepared can be used as a preferable ink composition for inkjet recording. When the radiation-curable polymerizable composition is used as an inkjet recording ink, the ink is ejected onto a recording material by means of an inkjet printer, and then the ejected composition (ink) is cured by being exposed to radiation so as to perform recording.

The print obtained using the ink has an image area cured by being exposed to radiation such as ultraviolet rays. The strength of the image area is high. Therefore, the ink can be applied to various uses such as a formation of an ink-receiving layer (an image area) of a planographic printing plate as well as an ink image formation.

Inkjet Recording Method and Inkjet Recording Apparatus

The present inkjet recording method includes at least ejecting the ink composition of the present invention onto a recording material by using an inkjet recording apparatus such as an inkjet recording printer and irradiating the ejected ink composition so as to cure the ink composition.

In the inkjet recording method, it is preferable that the ink composition is heated to be in a range of 40° to 80° C. so as to decrease the viscosity of the ink composition to be in a range of 7 to 30 mPa·s and then ejected. High ejection stability can be achieved by adopting such a method. Since a radiation cured ink composition generally has higher viscosity than a water-based ink, a variance of its viscosity due to variations in temperature during printing becomes greater. Such a viscosity variance of the ink composition directly has great influence on the size and ejecting speed of liquid-drops, and causes deterioration in image quality. Therefore, the ink composition temperature during the printing is required to be kept as constant as possible. The ink composition temperature is controlled preferably to within a set temperature ±5° C., more preferably to a set temperature ±2° C., and particularly preferably to a set temperature ±1° C.

One characteristic of the inkjet recording apparatus is to have a unit for stabilizing the temperature of the ink composition, which is to maintain a constant temperature for all piping systems and members installed in the range from an ink tank (or an intermediate tank when provided) to the ejection surface of the nozzles.

While there is no particular restriction to the method for controlling the temperature of an inkjet recording apparatus, examples of the controlling method include a method placing plural temperature sensors on each piping part and regulating the temperature by heating in accordance with the flow rate (quantity of flow) of an ink composition and ambient temperature. The head unit to be heated is preferably blocked or insulated from outside heat so that the unit body is unaffected by the temperature of outside air. In view of reducing a startup time required for a printer to be heated or reducing thermal energy loss, it is preferable that the head unit is thermally insulated from other sections, as well as having a small thermal capacity of the heating unit as a whole.

Next, the conditions for irradiation will be described. The basic irradiation method is disclosed in JP-A No. 60-132767. Specifically, a light source is installed on either side of a head unit, and the head and the light sources are made to scan in accordance with a shuttle system. After impact of ink droplets, irradiation is carried out a fixed time interval later. The curing is completed by further irradiation with another light source with no accompanying drive. WO 99/54415 discloses a method of using optical fibers and a method of shining a collimated light source on the surface of a mirror mounted on the side of a head unit and irradiating the recording areas with UV light. In the present invention, these irradiation methods can also be used.

In the invention, it is appropriate that the ink composition be heated to a given temperature and the interval between impact and irradiation be controlled to fall within the range of 0.01 to 0.5 seconds. Exposure to radiation after 0.01 to 0.3 seconds is preferable, and that after 0.01 to 0.15 second is more preferable. The control of an interval between impact and irradiation to a very short time makes it possible to prevent the ink having impacted on a recording material from spreading before being cured. In addition, such control also allows irradiation to start before permeation of the ink composition into the radiation-inaccessible depth of a recording material even when the recording material is porous, so that incidence of unreacted monomer residues is lowered, resulting in reduction of odor. The combined use of the inkjet recording method mentioned above and the ink composition of the invention can produce a great synergistic effect. This can be achieved specifically when using the ink composition having a viscosity of the ink composition at 25° C. in the range of 35 to 500 MP·s. By adopting such a recording method, consistent dot size of ink that has impacted can be ensured on various recording materials differing in surface wettability, and thus the image quality can be improved. Additionally, superimposing colors in order of increasing lightness is preferable for formation of color images. When ink of low lightness is superimposed, it is difficult for the irradiation light to reach the ink situated therebeneath; as a result, the curing sensitivity tends to be impaired, monomer residues increase in quantity, odor is emitted and the adhesiveness deteriorates. In terms of cure acceleration, color-by-color irradiation is preferred, though it is also possible that all of colors ejected are exposed to light at once.

The inkjet recording apparatus used in the invention has no particular restrictions, and it may be a commercially available inkjet recording apparatus. In other words, the recording on a recording material by use of a commercially available inkjet apparatus can be performed in the invention.

Recording Material

Recording materials to which the ink composition of the invention is applicable have no particular restrictions. Examples of the recording material include commonly-used paper such as uncoated paper or coated paper, various kinds of nonabsorbent resin materials used for the so-called soft wrapping, and resin films obtained by forming such materials into the shape of film. Specific examples of the various plastic films include PET film, OPS film, OPP film, ONy film, PVC film, PE film, and TAC film. Specific examples of other plastics usable as recording materials include polycarbonate, acrylic resin, ABS, polyvinyl acetal, PVA, and rubbers. In addition, metal and glass are also usable as recording materials.

The ink composition of the invention exhibits little thermal shrinkage at the time of curing and has high adhesion to a base material (recording material). Accordingly, the ink composition of the invention has an advantage in its capability to form high-definition images on films such as thermally shrinkable PET, OPS, OPP, ONy or PVC film which tend to curl and deform by curing shrinkage of ink and heat generated by curing reaction.

Planographic Printing Plate

One preferable example of the application of the ink composition of the invention is the utilization of the ink composition for forming a planographic printing plate.

A hydrophobic ink-receiving region can be formed in an imagewise pattern on a hydrophilic substrate surface of a hydrophilic substrate by ejecting, by using inkjet recording apparatus or the like, the ink composition onto the hydrophilic substrate and then irradiating the ejected ink composition so as to cure the ink composition. When a printing ink for and an aqueous ingredient are supplied to the thus processed substrate surface, the aqueous ingredient is held on bare regions (hydrophilic regions having no cured ink composition) of the hydrophilic substrate, while the printing ink is held on the hydrophobic ink-receiving regions. Accordingly, the resulting substrate can be subjected to printing operations as it is.

The ink composition of the invention shows excellent curability upon exposure to radiation. Therefore, the planographic printing plate formed by utilizing the ink composition of the invention can have an image area having excellent durability. In addition, the use of an inkjet recording apparatus for formation of an image area allows forming a planographic printing plate having a high-definition image area directly from digital data.

The ink composition of the invention can be applied as an ink composition for the making of a planographic printing plate as it is.

Substrate

The substrate used in preparing the planographic printing plate of the invention has no particular restriction so long as it is a dimensionally stable plate-shape substrate. The substrate forming material may be used as it is when it has a hydrophilic surface. Alternatively, the surface of the plate-shaped material of the substrate may be subjected to hydrophilization treatment before the substrate is used for the preparation of the planographic printing plate.

Examples of the material usable for forming the substrate used in the invention include paper, paper laminated with plastic (such as polyethylene, polypropylene or polystyrene), a plate formed of metal (such as aluminum, zinc or copper), a film of plastic (such as cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate or polyvinyl acetal), and paper or plastic films on which the above-recited metal is laminated or evaporated. Preferable examples of the substrate include a polyester film and an aluminum plate. Among these, an aluminum plate is especially preferable in terms of superiority in dimensional stability and relatively inexpensive price.

Examples of the aluminum plate include a pure aluminum plate, an alloy plate having aluminum as a main component and trace amounts of foreign elements, and a thin film of pure aluminum or aluminum alloy onto which plastic is laminated. Examples of the foreign elements contained in the aluminum alloy include silicon, iron, manganese, copper, magnesium, chromium, zinc, bismuth, nickel and titanium. The amount of the foreign elements in the aluminum alloy is preferably 10% by mass or less relative to the total amount of the aluminum alloy. While pure aluminum is preferable in the invention, aluminum containing foreign elements in small amounts may be used in consideration of the technological difficulty in refining to produce an absolutely pure aluminum. The composition of the aluminum plate is not particularly restricted, and any conventionally-known materials can be appropriately utilized.

The thickness of the substrate is preferably in a range of 0.1 to 0.6 mm, and is more preferably in a range of 0.15 to 0.4 mm.

When such an aluminum plate is used as the substrate of the planographic printing plate, the aluminum plate is preferably subjected to surface treatment, such as surface-roughening treatment or anodic oxidation treatment, before being provided with the composition of the invention. The surface treatment enables easily improving the hydrophilic property of the aluminum plate surface and ensuring sufficient adhesion between the aluminum plate surface and an image-recording layer of the planographic printing plate. Before the surface-roughening treatment, if needed, the aluminum plate can be subjected to degreasing treatment by using a surfactant, an organic solvent, an alkaline aqueous solution or the like for removing a rolling oil from the aluminum plate surface.

The roughening treatment of an aluminum plate surface can be carried out using any of various methods such as a mechanical surface-roughening treatment, an electrochemical surface-roughening treatment (a treatment of roughening an aluminum plate surface through electrochemical dissolution), and a chemical surface-roughening treatment (a treatment of roughening the surface through selective dissolution by chemical action).

Examples of the mechanical surface-roughening method include known methods such as a ball graining method, a brush graining method, a blast graining method or a buff graining method. Alternatively, it is acceptable to adopt a transfer method of using a roll having an uneven surface profile and transferring its unevenness to an aluminum plate surface at a rolling stage of aluminum during formation of the aluminum plate.

Examples of the electrochemical surface-roughening method include a method of roughening the surface of an aluminum plate in an electrolytic solution containing an acid such as hydrochloric acid or nitric acid by using alternating current or direct current through the electrolytic solution. Examples of the method further include a method using a mixed acid as described in JP-A No. 54-63902.

The thus surface-roughened aluminum plate can be subjected to alkali etching treatment with an aqueous solution such as that of potassium hydroxide or sodium hydroxide and further to neutralizing treatment, if needed. The surface-roughened aluminum plate can be further subjected to anodic oxidation treatment for enhancing abrasion resistance, if desired.

Examples of an electrolyte used for the anodic oxidation treatment of the aluminum plate include various electrolytes capable of forming porous oxide coating. In general, sulfuric acid, hydrochloric acid, oxalic acid, chromic acid, and mixed acids of two or more thereof can be used as such electrolytes. The concentration of electrolyte can be appropriately determined according to the kind of the electrolyte used.

While condition for anodic oxidation treatment cannot be comprehensively specified as it varies according to the electrolyte used, it is generally preferable that the electrolyte concentration in an electrolytic solution is in a range from 1 to 80% by mass, the solution temperature is in a range from 5 to 70° C., the current density is in a range from 5 to 60 amperes/dm$^2$, the voltage is in a range from 1 to 100 V, and the electrolysis time is in a range from 10 sec. to 5 min. The quantity of an anodic oxide coating formed is preferably in a range from 1.0 to 5.0 g/m$^2$, and is more preferably in a range from 1.5 to 4.0 g/m$^2$. When the conditions are controlled to be within the above ranges, an excellent printing durability of the planographic printing plate and an excellent scratch resistance in non-image areas of the planographic printing plate can be obtained.

The substrate that has been subjected to the surface treatments and further provided with an anodic oxide coating may be used in the invention as it is. Alternatively, in view of further improvements in adhesion to an upper layer, hydrophilicity, scumming resistance and thermal insulation, the substrate can be further subjected to treatment which is appropriately selected from enlarging of micropores of the anodic oxide coating, sealing of micropores of the anodic oxide coating, imparting of hydrophilicity to the surface by immersion into an aqueous solution of hydrophilic compound and the like such as described in JP-A Nos. 2001-253181 or 2001-322365. The additional treatments such as the enlarging treatments and the sealing treatments are not limited to those described in the documents cited above, and any of known methods can be applied to the present invention.

Sealing Treatment

Examples of the sealing treatment which can achieve the foregoing purposes include a steam sealing, a treatment with fluorozirconic acid alone, a sealing treatment with an aqueous solution containing an inorganic fluorine compound such as sodium fluoride, a vapor sealing treatment with lithium chloride-added steam, and a sealing treatment with hot water.

Among these sealing treatments, the sealing with an aqueous solution containing an inorganic fluorine compound, the steam sealing and the hot water sealing are particularly preferable.

Hydrophilization

Examples of the hydrophilizing treatment usable in the invention include the alkali metal silicate method such as that described in each of U.S. Pat. Nos. 2,714,066, 3,181,461, 3,280,734 and 3,902,734. In this method, a substrate is subjected to immersion or electrolytic treatment in an aqueous solution of sodium silicate or the like. Examples of the hydrophilizing treatment further include the method of treating with potassium fluorozirconate described in JP-B-36-22063 and the method of treating with polyvinylphosphonic acid described in each of U.S. Pat. Nos. 3,276,868, 4,153,461 and 4,689,272.

It is preferable that a center-line average roughness of the substrate utilized in the planographic printing plate of the invention is in a range of 0.10 to 1.2 μm. When the center-line average roughness is within the range, the substrate can be brought into intimate contact with an image-recording layer (image areas) and the planographic printing plate can ensure a sufficient durability and satisfactory scumming resistance.

EXAMPLES

While the invention is described in more detail by reference to the following examples, the embodiments in these examples should not be construed as limiting the scope of the invention.

Example 1

Preparation of Pigment Dispersion

Yellow pigment dispersion 1, magenta pigment dispersion 1, cyan pigment dispersion 1 and black pigment dispersion 1, each of which has the following respective formulation, were prepared. Each pigment was dispersed by use of a known dispersing apparatus under dispersing conditions properly adjusted so that the average size of the pigment particles fell within the range of 0.2 to 0.3 μm, and then the dispersion thus obtained was filtered under heating, thereby preparing the intended dispersion.

| Yellow Pigment Dispersion 1 | |
|---|---|
| C.I. Pigment Yellow 12 | 10 parts by mass |
| Polymeric dispersing agent (SOLSPERSE ® Series: manufactured by Zeneca) | 5 parts by mass |
| Stearyl acrylate | 85 parts by mass |
| Magenta Pigment Dispersion 1 | |
| C.I. Pigment Red 57:1 | 15 parts by mass |
| Polymeric dispersing agent (SOLSPERSE ® Series: manufactured by Zeneca) | 5 parts by mass |
| Stearyl acrylate | 80 parts by mass |
| Cyan Pigment Dispersion 1 | |
| C.I. Pigment Blue 15:3 | 20 parts by mass |
| Polymeric dispersing agent (SOLSPERSE ® Series: manufactured by Zeneca) | 5 parts by mass |
| Stearyl acrylate | 75 parts by mass |
| Black Pigment Dispersion 1 | |
| C.I. Pigment Black 7 | 20 parts by mass |
| Polymeric dispersing agent (SOLSPERSE ® Series: manufactured by Zeneca) | 5 parts by mass |
| Stearyl acrylate | 75 parts by mass |

Preparation of Ink Composition

An ink composition of each color was prepared by mixing the following ingredients and then passing the mixture through a filter. Fractions are mass ratios.

| Yellow ink composition 1 | |
|---|---|
| (a) Hindered amine compound (A-1) having the following structure: | 0.5 g |
| (b) Photo-acid generating agent: (Exemplary compound (b-24)/Exemplary compound (b-29) = 1/2) | 5 g |
| (c) Cationic polymerizable monomer: | |
| Epoxy compound (trade name: CELOXIDE 2021, manufactured by Daicel UCB Co., Ltd.) | 35 g |
| Oxetane compound (trade name: OXT-221, manufactured by TOAGOSEI Co., Ltd.) | 55 g |
| Coloring agent (pigment dispersion): | |
| Yellow pigment dispersion 1 | 5 g |
| Magenta ink composition 1 | |
| (a) Hindered amine compound (A-1) having the following structure: | 0.5 g |
| (b) Photo-acid generating agent: (Exemplary compound (b-24)/Exemplary compound (b-29) = 1/2) | 5 g |

| -continued | |
|---|---|
| (c) Cationic polymerizable monomer: | |
| Epoxy compound (trade name: CELOXIDE 2021, manufactured by Daicel UCB Co., Ltd.) | 35 g |
| Oxetane compound (trade name: OXT-221, manufactured by TOAGOSEI Co., Ltd.) | 55 g |
| Coloring agent (pigment dispersion): | |
| Magenta pigment dispersion 1 | 5 g |
| Cyan ink composition 1 | |
| (a) Hindered amine compound (A-1) having the following structure: | 0.5 g |
| (b) Photo-acid generating agent: (Exemplary compound (b-24)/Exemplary compound (b-29) = 1/2) | 5 g |
| (c) Cationic polymerizable monomer: | |
| Epoxy compound (trade name: CELOXIDE 2021, manufactured by Daicel UCB Co., Ltd.) | 35 g |
| Oxetane compound (trade name: OXT-221, manufactured by TOAGOSEI Co., Ltd.) | 55 g |
| Coloring agent (pigment dispersion): | |
| Cyan pigment dispersion 1 | 5 g |
| Black ink composition 1 | |
| (a) Hindered amine compound (A-1) having the following structure: | 0.5 g |
| (b) Photo-acid generating agent: (Exemplary compound (b-24)/Exemplary compound (b-29) = 1/2) | 5 g |
| (c) Cationic polymerizable monomer: | |
| Epoxy compound (trade name: CELOXIDE 2021, manufactured by Daicel UCB Co., Ltd.) | 35 g |
| Oxetane compound (trade name: OXT-221, manufactured by TOAGOSEI Co., Ltd.) | 55 g |
| Coloring agent (pigment dispersion): | |
| Black pigment dispersion 1 | 5 g |
| Sensitizer: 9,10-dibutoxyanthracene | 0.5 g |

Evaluation of Multicolored Image Formed by Inkjet Image Recording

Recording on a recording material was performed using a commercially available inkjet recording apparatus equipped with piezo-type inkjet nozzles. The ink feeding system of the apparatus included source tanks, feed piping, ink feed tanks installed immediately in front of a piezo-type inkjet head, filters and the piezo-type inkjet head. Heating and insulation were given to the section extending from the ink feed tanks to the inkjet head. The temperature sensors were put in the ink feed tanks and in the vicinity of nozzles of the inkjet head, respectively, and the temperature in the nozzle region was controlled so as to be within a range of 70° C.±2° C. The piezo-type inkjet head was driven so that multiple-size dots of 8 to 30 pl can be ejected in 720×720 dpi resolution. The exposure system, the main scan speed and the ejection frequencies were adjusted so that UV-A light was condensed so as to have illuminance of 100 mW/cm$^2$ at the exposed surface and the irradiation was started after 0.1 second after the impact of ink droplets onto the recording material. In addition, the exposure time was made to be variable, and application of exposure light energy was carried out. Incidentally, the term "dpi" herein used refers to the number of dots per 2.54 cm.

The black ink composition, the cyan ink composition, the magenta ink composition and the yellow ink composition prepared in the foregoing manners were sequentially ejected in this order at ambient temperature of 25° C., while irradiation with UV light was performed when ejection of each of the ink compositions was ejected. The irradiation of the UV was carried out so that the total exposure energy per color becomes 300 mJ/cm$^2$, which is enough to completely cure the ink composition of each color so that tackiness is not observed by touch with fingers. The recording materials used herein were an aluminum substrate grained with sand, a transparent biaxially-stretched polypropylene film having subjected to a surface treatment so as to have printing suitability, a soft sheet of vinyl chloride, a cast-coated paper sheet and a commercially available recycled paper. When images of each color were recorded on each of these recording materials, high-resolution images which are free of blurring of dots were obtained. Even in the case when wood free paper was used, each ink composition was cured to a sufficient degree and was free from a strike-through phenomenon, and besides, almost no odor due to unreacted monomers was traceable. Further, the ink composition recorded on the film had sufficient flexibility. No crack was generated on the ink composition recorded on the film (ink composition cured on the film) even when the film was bent. There was no problem in the ink composition recorded on the film when it was subjected to an adhesion test using peeling of a cellophane tape.

Examples 2 to 12 and Comparative Examples 1 To 4

Preparation of Ink Composition

Magenta ink compositions 2 to 12 were prepared by mixing the following ingredients and passing each of the resulted mixtures through a filter. In addition, an ink composition of Comparative Example 1 was prepared in the same manner as the ink composition of Example 12, except that (a) the hindered amine compound having the specific structure was not incorporated therein. Further, an ink composition of Comparative Example 2 was prepared in the same manner as the ink composition of Example 12, except that tributylamine, which is a tertiary amine compound having no hindered amine structure, was added in place of the (a) hindered amine compound having the specific structure. An ink composition of Comparative Example 3 was prepared in the same manner as the ink composition of Example 12, except that the (a) hindered amine compound having the specific structure was replaced with the same amount of commercially available photo-stabilizer TINUVIN® 765 (described above), which has both a hindered amine structure and a polar moiety. Furthermore, an ink composition of Comparative Example 4 was prepared in the same manner as the ink composition of Example 12, except that the (a) hindered amine compound having the specific structure was replaced with 2,2,6,6-tetramethyl-4-piperidinyl methacrylate, which is a hindered amine compound having a polar moiety. Incidentally, the ink compositions in Comparative Examples 2 to 4 were obtained in the same manner as the ink composition of Example 12, except that (a) the hindered amine compound having the specific structure was respectively replaced with the foregoing compounds.

Magenta Ink Compositions 2 to 12

| | |
|---|---|
| (a) Hindered amine compound specific in structure (Compound shown in Table 1) | 0.5 g |
| (b) Photo-acid generating agent (Compound shown in Table 1) | 5 g |
| (c) Cationic polymerizable monomers | 90 g |
| (d) Coloring agent (the aforementioned Magenta Pigment Dispersion 1) | 5 g |

Details of the cationic polymerizable monomers shown in Table 1 are as follows.

Cationic Polymerizable Compound 1:

Mixture of epoxy compound (CELOXIDE 2021, produced by Daicel UCB Co.,Ltd.) and oxetane compound (OXT-221, produced by TOAGOSEI Co., Ltd.) in the mass ratio of 35:55

Cationic Polymerizable Compound 2:

Mixture of epoxy compound (CELOXIDE 2021, produced by Daicel UCB Co.,Ltd.) and oxetane compound (OXT-221, produced by TOAGOSEI Co., Ltd.) in the mass ratio of 50:40

The ink compositions prepared in Examples and Comparative examples had viscosity being within a range of 7 to 20 mPa·s at the temperature when the ink composition were ejected.

Evaluation of Monochromatic Image Formed by Inkjet Image Recording

In the same manner as in Example 1, magenta images were printed with each of the thus prepared magenta ink compositions 2 to 12 and Magenta ink composition 1 prepared in Example 1.

Evaluations of Inkjet Image

The images printed with each of the magenta ink compositions were evaluated in terms of sensitivity to exposure required for curing, storage stability, permeability into commercially available recycled paper, ink blurring on a grained aluminum substrate, and adhesion to a grained aluminum substrate in accordance with each of the following methods.

1. Measurement of Sensitivity to Exposure (Light) Required for Curing

The amount of exposure energy ($mJ/cm^2$) required for disappearance of tackiness of a surface of each image by UV irradiation was defined as the sensitivity to curing. The smaller energy value, the higher sensitivity to curing the ink composition has.

2. Evaluation of Storage Stability

After each ink composition was stored for 3 days under the condition of 75% RH-60° C., the viscosity of the ink composition at the temperature at which the ink composition is used for ejecting was measured. The increase in the viscosity of the ink composition was expressed in terms of the ratio (a/b) of (a) the viscosity of the ink composition after storage to (b) the viscosity of the ink composition before storage. The nearer the ratio is to 1.0 as a result of smaller change in viscosity, the better the storage stability of the ink composition is. When the ratio goes up to over 1.5, undesirable clogging may occur at the time of ejection of the ink composition.

3. Evaluation of Permeability into Commercially Available Recycled Paper

The permeability of the ink composition was evaluated by examining the images printed on commercially available recycled paper in accordance with the following criteria.

A: Permeation is negligible and there is no smell of residual monomers.

B: Slight permeation of the ink composition and a faint smell of residual monomers are perceived.

X: Obviously the ink composition permeates through paper and there is a remarkable odor of residual monomers.

4. Evaluation of Blurring of Ink Composition on Grained Aluminum Substrate

The blurring of the ink composition was evaluated by examining the images printed on a grained aluminum substrate in accordance with the following criteria.

A: No blurring of the ink composition is observed between adjacent dots.

B: Slight dot blurring is observed.

X: Dots are spread and images are obviously blurred.

5. Evaluation of Adhesion to Grained Aluminum Substrate

The adhesion property of the ink image printed on the grained aluminum substrate was evaluated as follows. Namely, one sample having no scratch on its printed surface and another sample having 100 sections of 1-mm square made in a grid pattern by cutting the sample with 11 vertical lines and 11 horizontal lines on its printed surface in accordance with a conventionally-known testing method of coating materials (the cross-cut adhesion test) were prepared for each of the ink images. A cellophane tape was affixed onto a surface of each of the samples and quickly peeled off at an angle of 90°. After this action, the appearance of printed images or sections remaining unpeeled was evaluated according to the following criteria.

A: No exfoliation of the printed image is observed even in the cross-cut adhesion test.

B: While a few flakes of ink compositions are observed in the cross-cut adhesion test, almost no exfoliation is observed as long as the surface of the sample has no scratch.

X: The printed image is easily peeled away with a cellophane tape in both of the test conditions.

Evaluation of Ink Composition for Planographic Printing Plate Application

Images are formed on the grained aluminum substrate by printing with each of the ink compositions prepared in Examples and Comparative Examples. Each of the resultants is used as a planographic printing plate, and evaluations thereof in terms of the image-quality and the printing durability are performed as follows.

Evaluation of Image-Quality

Each of the planographic printing plates made with each of the ink compositions prepared in Examples and Comparative Examples was mounted in a printer (trade name: HEIDEL KOR-D, manufactured by Heidelberg Co.) and printing onto paper sheets was performed therewith while feeding thereto a printing ink (trade name: SHEET-SPECIFIC VALUES-G CRIMSON, manufactured by Dainippon Ink & Chemicals, Inc.) and a fountain solution (trade name: ECOLITY 2, manufactured by FUJIFILM Corporation). The print obtained when the printing onto the 100th sheet was finished was evaluated by visual observation in accordance with the following criteria.

A: The print having neither image deletion in the image area nor stain in the non-image area is obtained.

B: Slight image deletion is observed in the image area and/or slight stain is observed in the non-image area.

X: Image deletion in the image area and/or a slight stain in the non-image area, which is at a level where concerns rise in practical applications, is observed.

Evaluation of Printing Durability

The printing was continued, and the number of sheets printed with no image deletion in the image area and no stain in the non-image area was adopted as the index of the printing durability. The printing durability is shown as a relative value with the number of such sheets obtained at Example 1 being taken as 100. The greater the number is, the higher the printing durability of the planographic printing plate is.

The results of the evaluations are shown in the following Table 1.

TABLE 1

| | Ink Composition | | | Evaluation | | | | | | |
|---|---|---|---|---|---|---|---|---|---|---|
| | (a) Amine Compound Specific in Structure | (b) Photo-acid generating agent | (c) cationic Polymerizable Monomer | Permeability into Recycled Paper | Spread on Aluminum Substrate | Adhesion to Aluminum Substrate | Sensitivity for Curing (mJ/cm$^2$) | Ink Storage Stability | Image Quality of Planographic Printing Plate | Printing durability |
| Example 2 | A-2 | b-3 | 1 | A | A | A | 300 | 1.0 | A | 110 |
| Example 3 | A-5 | b-3 | 1 | A | A | A | 300 | 1.1 | A | 120 |
| Example 4 | A-6 | b-3 | 1 | A | A | A | 300 | 1.1 | A | 120 |
| Example 5 | A-8 | b-3 | 1 | A | A | A | 320 | 1.1 | A | 100 |
| Example 6 | A-12 | b-3 | 1 | A | A | A | 310 | 1.2 | A | 110 |
| Example 7 | A-19 | b-24 | 2 | A | A | A | 310 | 1.1 | A | 110 |
| Example 8 | A-25 | b-24 | 2 | A | A | A | 300 | 1.1 | A | 120 |
| Example 9 | A-26 | b-24 | 2 | A | A | A | 310 | 1.2 | A | 110 |
| Example 10 | A-31 | b-24 | 2 | A | A | A | 300 | 1.2 | A | 100 |
| Example 11 | A-38 | b-24 | 2 | A | A | A | 300 | 1.1 | A | 100 |
| Example 12 | A-41 | b-24 | 2 | A | A | A | 320 | 1.2 | A | 110 |
| Comparative example 1 | (None) | b-24 | 1 | B | B | A | 300 | 1.7 | A | 110 |
| Comparative example 2 | Tributylamine | b-24 | 1 | B | B | A | 610 | 1.3 | A | 80 |
| Comparative example 3 | TINUVIN ® 765 | b-24 | 1 | B | B | A | 550 | 1.2 | A | 90 |
| Comparative example 4 | Comparative compound 1* | b-24 | 1 | A | A | A | 450 | 1.3 | A | 100 |

*Comparative compound 1: 2,2,6,6-tetramethyl-4-piperidinyl methacrylate

As can be seen from Table 1, the ink composition prepared in each of the Examples was cured with the high sensitivity upon exposure to radiation, allowed the high-quality image formation even in the printing on paper, and had the good storage stability. Those evaluation results reveal that both of the curing sensitivity and the storage stability of the ink composition were achieved at the same time by the invention.

On the other hand, the ink composition prepared in Comparative Example 1, which was free of (a) the hindered amine compound having the specific structure, had a problem with the storage stability, and besides, it is a little inferior in the permeability into recycled paper and the blurring on the aluminum substrate. Further, it has been shown that the ink compositions prepared in Comparative Examples 2 to 4, in which the normal amine compound and the hindered amine compounds having nucleophilic moieties were used in place of the (a) hindered amine compound having the specific structure, had great reductions in the curing sensitivity while improvement in their storage stability might be observed. The test results indicate that achievement of both of the curing sensitivity and the storage stability of an ink composition at the same time is generally difficult.

In addition, it has been shown that the planographic printing plates with images formed from the ink compositions of the invention are able to provide high-quality prints and have satisfactory printing durability.

What is claimed is:

1. A radiation-curable polymerizable composition comprising (a) a hindered amine compound having no nucleophilic moiety, (b) a photo-acid generating agent and (c) a cationic polymerizable monomer, wherein the hindered amine compound having no nucleophilic moiety is represented by any one of the following Formulae II to III and Formulae V to VII:

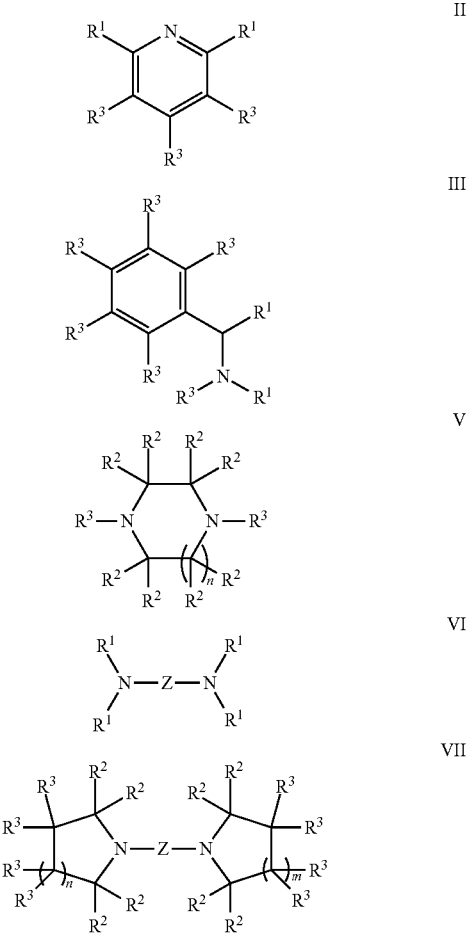

wherein $R^1$ represents branched alkyl group having 3 to 8 carbon atoms, a cycloalkyl group having 3 to 10 carbon atoms or an aralkyl group having 7 to 20 carbon atoms;

$R^2$ represents a linear alkyl group having 1 to 4 carbon atoms, a branched alkyl group having 3 to 6 carbon atoms or an aryl group having 6 to 12 carbon atoms; $R^3$ represents a hydrogen atom, a linear alkyl group having 1 to 20 carbon atoms, a branched alkyl group having 3 to 6 carbon atoms, a cycloalkyl group having 3 to 10 carbon atoms, an aryl group having 6 to 12 carbon atoms, an aralkyl group having 7 to 20 carbon atoms or an alkenyl group having 2 to 20 carbon atoms; the two or more groups respectively represented by $R^1$s in one molecule may be the same or different, and may be bonded with each other to form a ring structure; the two or more groups respectively represented by $R^2$s in one molecule may also be the same or different, and may be bonded with each other to form a ring structure; Z represents a divalent organic group formed of hydrocarbons; and n and m each represent an integer from 1 to 3.

2. The radiation-curable polymerizable composition of claim 1, wherein the hindered amine compound having no nucleophilic moiety contains carbon atoms, hydrogen atoms and one or more nitrogen atoms.

3. The radiation-curable polymerizable composition of claim 1, wherein the hindered amine compound having no nucleophilic moiety is represented by Formula VI or VII.

4. An ink composition formed from a radiation-curable polymerizable composition, the radiation-curable polymerizable composition comprising (a) a hindered amine compound having no nucleophilic moiety, (b) a photo-acid generating agent and (c) a cationic polymerizable monomer, wherein the hindered amine compound having no nucleophilic moiety is represented by any one of the following Formulae II to III and Formulae V to VII:

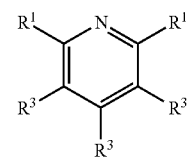

II

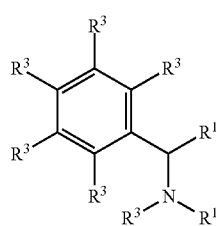

III

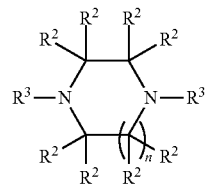

V

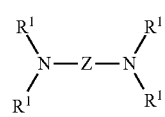

VI

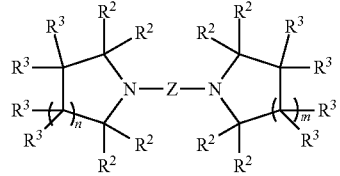

VII wherein $R^1$ represents a branched alkyl group having 3 to 8 carbon atoms, a cycloalkyl group having 3 to 10 carbon atoms or an aralkyl group having 7 to 20 carbon atoms; $R^2$ represents a linear alkyl group having 1 to 4 carbon atoms, a branched alkyl group having 3 to 6 carbon atoms or an aryl group having 6 to 12 carbon atoms; $R^3$ represents a hydrogen atom, a linear alkyl group having 1 to 20 carbon atoms, a branched alkyl group having 3 to 6 carbon atoms, a cycloalkyl group having 3 to 10 carbon atoms, an aryl group having 6 to 12 carbon atoms, an aralkyl group having 7 to 20 carbon atoms or an alkenyl group having 2 to 20 carbon atoms; the two or more groups respectively represented by $R^1$s in one molecule may be the same or different, and may be bonded with each other to form a ring structure; the two or more groups respectively represented by $R^2$s in one molecule may also be the same or different, and may be bonded with each other to form a ring structure; Z represents a divalent organic group formed of hydrocarbons; and n and m each represent an integer from 1 to 3.

5. The ink composition of claim 4, wherein the addition amount of the (a) hindered amine compound having no nucleophilic moiety is in the range of 0.05 mass % to 20 mass % relative to the total amount of the ink composition.

6. The ink composition of claim 4, wherein the hindered amine compound having no nucleophilic moiety comprises carbon atoms, hydrogen atoms and one or more nitrogen atoms.

7. The ink composition of claim 6, wherein the addition amount of the (a) hindered amine compound having no nucleophilic moiety is in the range of 0.05 mass % to 20 mass % relative to the total amount of the ink composition.

8. The ink composition of claim 4, wherein the addition amount of the (a) hindered amine compound having no nucleophilic moiety is in the range of 0.05 mass % to 20 mass % relative to the total amount of the ink composition.

9. The ink composition of claim 4, wherein the hindered amine compound having no nucleophilic moiety is represented by Formula VI or VII.

10. A method for ink jet recording comprising: ejecting an ink composition onto a recording medium by using an ink jet recording apparatus; and irradiating the ejected ink composition so as to cure the ink composition, wherein the ink composition is formed from a radiation-curable polymerizable composition from claim 1.

11. The method for ink jet recording of claim 10, wherein the addition amount of the (a) hindered amine compound having no nucleophilic moiety is in the range of 0.05 mass % to 20 mass % relative to the total amount of the ink composition.

12. A printed material obtained by a method comprising: ejecting an ink composition onto a recording medium by using an ink jet recording apparatus; and irradiating the ejected ink composition so as to cure the ink composition, wherein the ink composition is formed from a radiation-curable polymerizable composition of claim 1.

13. The printed material of claim 12, wherein the addition amount of the (a) hindered amine compound having no nucleophilic moiety is in the range of 0.05 mass % to 20 mass % relative to the total amount of the ink composition.

14. A method for forming a planographic printing plate comprising: ejecting an ink composition onto a hydrophilic support by using an ink jet recording apparatus; and irradiating the ejected ink composition so as to cure the ink composition and form a hydrophobic region, wherein the ink composition is formed from a radiation-curable polymerizable composition of claim 1.

15. The method of claim 14, wherein the addition amount of the (a) hindered amine compound having no nucleophilic moiety is in the range of 0.05 mass % to 20 mass % relative to the total amount of the ink composition.

16. A planographic printing plate comprising a hydrophobic region which is formed by a method comprising: ejecting an ink composition onto a hydrophilic support by using an ink jet recording apparatus; and irradiating the ejected ink composition so as to cure the ink composition, wherein the ink composition is formed from a radiation-curable polymerizable composition of claim 1.

17. The planographic printing plate of claim 16, wherein the addition amount of the (a) hindered amine compound having no nucleophilic moiety is in the range of 0.05 mass % to 20 mass % relative to the total amount of the ink composition.

* * * * *